(12) United States Patent
Aritoshi et al.

(10) Patent No.: US 9,047,904 B2
(45) Date of Patent: Jun. 2, 2015

(54) MAGNETIC RECORDING MEDIUM

(75) Inventors: Yohei Aritoshi, Kanagawa (JP); Kazufumi Omura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 719 days.

(21) Appl. No.: 12/750,140

(22) Filed: Mar. 30, 2010

(65) Prior Publication Data

US 2010/0247972 A1    Sep. 30, 2010

(30) Foreign Application Priority Data

Mar. 31, 2009   (JP) ................................ 2009-087738

(51) Int. Cl.
| | | |
|---|---|---|
| G11B 5/71 | (2006.01) | |
| G11B 5/702 | (2006.01) | |
| G11B 5/70 | (2006.01) | |
| G11B 5/738 | (2006.01) | |

(52) U.S. Cl.
CPC ............ *G11B 5/7021* (2013.01); *G11B 5/7013* (2013.01); *G11B 5/738* (2013.01)

(58) Field of Classification Search
None
See application file for complete search history.

(56) References Cited

U.S. PATENT DOCUMENTS

| | | | |
|---|---|---|---|
| 4,798,755 A * | 1/1989 | Yamada et al. ............... | 428/141 |
| 4,885,208 A | 12/1989 | Araki et al. | |
| 5,318,838 A | 6/1994 | Matsufuji et al. | |
| 5,619,480 A * | 4/1997 | Seo et al. ......................... | 369/14 |
| 6,506,486 B1 | 1/2003 | Araki et al. | |
| 6,677,036 B2 | 1/2004 | Noguchi et al. | |
| 2002/0164504 A1 | 11/2002 | Masaki | |
| 2003/0143323 A1 | 7/2003 | Noguchi et al. | |
| 2004/0253483 A1 * | 12/2004 | Watanabe et al. ......... | 428/694 B |
| 2004/0265642 A1 * | 12/2004 | Lowery et al. ......... | 428/694 BA |
| 2005/0112410 A1 * | 5/2005 | Mori et al. ............. | 428/694 BU |

FOREIGN PATENT DOCUMENTS

| | | |
|---|---|---|
| EP | 1617420 A2 | 1/2006 |
| JP | 63-042025 A | 2/1988 |
| JP | 01-189025 A | 7/1989 |
| JP | 04-302818 A | 10/1992 |
| JP | 5-73898 A | 3/1993 |
| JP | 06-301965 A | 10/1994 |
| JP | 2001-076333 A | 3/2001 |
| JP | 2001-297427 A | 10/2001 |
| JP | 2002-025034 A | 1/2002 |
| JP | 2003-085733 A | 3/2003 |
| JP | 2003-132531 A | 5/2003 |
| JP | 2005-353222 A | 12/2005 |
| JP | 2007-265511 A | 10/2007 |

OTHER PUBLICATIONS

Office Action dated Jul. 10, 2012 in Japanese Patent Application No. 2009-087738.

* cited by examiner

*Primary Examiner* — Holly Rickman
*Assistant Examiner* — Linda Chau
(74) *Attorney, Agent, or Firm* — Sughrue Mion, PLLC

(57) ABSTRACT

An aspect of the present invention relates to a magnetic recording medium comprising a nonmagnetic layer comprising a nonmagnetic powder and a binder and a magnetic layer comprising a ferromagnetic powder and a binder in this order on a nonmagnetic support, wherein the magnetic layer and/or nonmagnetic layer comprises organic acid A and organic acid B below, with an acid strength pKa(A) of organic acid A and an acid strength pKa(B) of organic acid B satisfying a relation of $pKa(A)<pKa(B)$;

organic acid A: an unsaturated bond-containing organic acid comprising one substituent selected from the group consisting of a carboxyl group, a phosphoric acid group, and a phosphonic acid group per molecule;

organic acid B: an aliphatic or alicyclic organic acid in which two or more substituents substituted onto adjacent carbon atoms within the molecule are present per molecule, and at least one of the substituents is a carboxyl group.

9 Claims, No Drawings

MAGNETIC RECORDING MEDIUM

CROSS-REFERENCE TO RELATED APPLICATIONS

This application claims the benefit of priority under 35 USC 119 to Japanese Patent Application No. 2009-087738, filed on Mar. 31, 2009, which is expressly incorporated herein by reference in its entirety.

BACKGROUND OF THE INVENTION

1. Field of the Invention

The present invention relates to a magnetic recording medium, and more particularly, to a magnetic recording medium that can exhibit excellent electromagnetic characteristics and repeat running durability.

2. Discussion of the Background

Magnetic recording technology affords advantages not found in other recording systems, such as permitting the repeated use of a medium; allowing the ready conversion of signals to digital and thus permitting the construction of systems by combining peripheral equipment; and allowing for the simple modification of signals. Thus, it is widely employed in a variety of fields such as video, audio, and computer applications.

Recording densities are increasing rapidly in the magnetic recording media employed in computer applications. Improvement in electromagnetic characteristics is essential to achieving this. Known means of improving electromagnetic characteristics include employing finer particles of ferromagnetic powder, dispersing these particles to a higher degree, reducing the thickness of the magnetic layer, rendering the magnetic layer more uniform, and achieving an ultrasmooth medium surface. For example, the method of incorporating a polar group such as an $SO_3Na$ group into a polymeric binder is widely employed to increase the dispersion of microparticulate magnetic powders (for example, see Japanese Unexamined Patent Publication (KOKAI) No. 2003-132531 (Document 1) or English language family members US 2003/0143323 A1 and U.S. Pat. No. 6,677,036, which are expressly incorporated herein by reference in their entirety).

There is a known method of adsorbing onto the surface of a magnetic powder an organic additive of relatively low molecular weight that combines a moiety with high affinity for magnetic powder and a moiety with high affinity for binder in a single skeleton to modify the surface properties of the surface of the magnetic powder so as to adapt them to those of the binder and achieve high dispersibility. Examples of typical substituents having high affinity for magnetic powder are acid groups such as the sulfonic acid groups, carboxyl groups, phosphoric acid groups described in Japanese Unexamined Patent Publication (KOKAI) Showa No. 63-42025 (Document 2) or English language family member U.S. Pat. No. 4,885,208 and Japanese Unexamined Patent Publication (KOKAI) Heisei No. 1-189025 (Document 3) or English language family member U.S. Pat. No. 5,318,838, which are expressly incorporated herein by reference in their entirety.

Ensuring running durability is important to the recording and reproducing of signals by direct contact between medium and head. For example, Japanese Unexamined Patent Publication (KOKAI) No. 2001-76333 (Document 4) or English language family member U.S. Pat. No. 6,506,486 and Japanese Unexamined Patent Publication (KOKAI) No. 2003-85733 (Document 5), which are expressly incorporated herein by reference in their entirety, propose blending lubricants such as higher fatty acids and higher fatty acid esters into the magnetic layer and the nonmagnetic layer beneath the magnetic layer to stabilize the sliding properties of the medium and head and ensure running durability. Further, Japanese Unexamined Patent Publication (KOKAI) Heisei Nos. 4-302818 (Document 6) and 6-301965 (Document 7) and Japanese Unexamined Patent Publication (KOKAI) No. 2005-353222 (Document 8), which are expressly incorporated herein by reference in their entirety, propose the acid treatment of the magnetic powder surface with a polyvalent organic acid to enhance the resistance to oxidation and rusting of the magnetic powder and inhibit adsorption to the magnetic powder of specific additives introduced with the goal of enhancing sliding characteristics of the magnetic layer surface.

However, techniques proposed in the above documents are insufficient because of the following reasons.

The introduction of a polar group into the binder as described in Document 1 is an effective means of improving dispersion by bringing about efficient adsorption of the binder to the surface of the magnetic powder. However, when an excessive quantity of polar groups is introduced into the binder, the binder forms bridges by adsorption between particles of magnetic powder, promoting aggregation and presenting the risk of compromising dispersion.

With the organic additives described in Documents 2 and 3, the quantity of additive employed should be increased when the surface area of the magnetic powder is increased to cause the acid groups in the molecule to adsorb at basic points on the surface of the magnetic powder. With the microparticulate magnetic powders that are employed to achieve good electromagnetic characteristics in high density magnetic recording media, the surface area of the powder necessarily increases. Thus, the quantity of additive that is added should be increased to enable the use of microparticulate magnetic powder. However, since the above-described organic additive comprises an acid group, the addition of a large quantity causes corrosion of the surface of the magnetic powder by the acid, and metal atoms present on the surface of the magnetic powder, such as Fe, Co, Al, and Y, are sometimes converted to cations and released. The metal cations sometimes react with the higher fatty acid and fatty acid ester materials employed to enhance sliding characteristics described in Documents 4 and 5, producing fatty acid metal salts. When these fatty acid metal salts are produced on the surface of the magnetic layer, they cause phenomenon in that they build up on the head with repeat running, causing drop out and increasing the error rate, and compromise repeat running durability by increasing frictional force through a reduction in the absolute quantity of lubricant.

When an organic additive is decreased to prevent the above phenomenon, there are disadvantages in that it is no longer possible to ensure dispersion, and coverage of basic points on the magnetic powder is inadequate. When numerous basic points that have not been covered are present, the fatty acid and fatty acid ester react directly with the basic points, producing fatty acid metal salts.

By contrast, above-cited Documents 6 to 8 propose the acid treatment of the magnetic powder surface with a polyvalent organic acid. However, when modifying the surface of the magnetic powder with a polyvalent organic acid, not only is the surface of the magnetic powder acidified, but it is also rendered hydrophilic. Thus, affinity decreases between the polymeric binder, which is hydrophobic, and the magnetic powder, which has been rendered hydrophilic. Adsorption of binder onto the surface of the magnetic powder is blocked, and as a result, dispersion ends up deteriorating. As a result, the surface of the magnetic recording medium becomes coarse, spacing between the medium and the head increases, particulate noise due to aggregation of magnetic powder increases, and in systems of high recording density, adequate electromagnetic characteristics cannot be achieved.

As described above, by the techniques proposed up to now, it is difficult to achieve both excellent electromagnetic characteristics and repeat running durability.

SUMMARY OF THE INVENTION

An aspect of the present invention provides for a magnetic recording medium affording both excellent electromagnetic characteristics and repeat running durability.

The present inventors conducted extensive research into achieving the above-stated magnetic recording medium. As a result, they discovered that by adding two specific organic acids to the magnetic layer and/or nonmagnetic layer, it was possible to enhance dispersion and inhibit the generation of fatty acid metal salts, thereby obtaining a magnetic recording medium having good electromagnetic characteristics and repeat running durability. The present invention was devised on that basis.

An aspect of the present invention (referred to as "Aspect 1", hereinafter) relates to a magnetic recording medium comprising a nonmagnetic layer comprising a nonmagnetic powder and a binder and a magnetic layer comprising a ferromagnetic powder and a binder in this order on a nonmagnetic support, wherein the magnetic layer comprises organic acid A and organic acid B below, with an acid strength pKa(A) of organic acid A and an acid strength pKa(B) of organic acid B satisfying a relation of pKa(A)<pKa(B);

organic acid A: an unsaturated bond-containing organic acid comprising one substituent selected from the group consisting of a carboxyl group, a phosphoric acid group, and a phosphonic acid group per molecule;

organic acid B: an aliphatic or alicyclic organic acid in which two or more substituents substituted onto adjacent carbon atoms within the molecule are present per molecule, and at least one of the substituents is a carboxyl group.

A further aspect of the present invention (referred to as "Aspect 2", hereinafter) relates to a magnetic recording medium comprising a nonmagnetic layer comprising a nonmagnetic powder and a binder and a magnetic layer comprising a ferromagnetic powder and a binder in this order on a nonmagnetic support, wherein the nonmagnetic layer comprises organic acid A and organic acid B above, with an acid strength pKa(A) of organic acid A and an acid strength pKa(B) of organic acid B satisfying a relation of pKa(A)<pKa(B).

In Aspect 2, the magnetic layer may comprise organic acid A.

In Aspects 1 and 2, at least one of the substituents comprised in organic acid B may be a hydroxyl group.

In Aspects 1 and 2, the unsaturated bond comprised in organic acid A may be comprised in an aromatic heterocyclic ring or a benzene ring.

In Aspects 1 and 2, the binder may comprise an aromatic ring component.

In Aspects 1 and 2, the binder may comprise a sulfonic acid (salt) group-containing binder.

In Aspects 1 and 2, the binder may comprise a polyurethane having a glass transition temperature ranging from 75° C. to 150° C.

In Aspects 1 and 2, the binder may comprise a polyester polyurethane in the form of a reaction product of polyester polyol (A) comprising structural components in the form of a dibasic acid and a glycol component, aromatic isocyanate (B), and compound (C) with a molecular weight of less than 1,000 having two or more functional groups per molecule that are capable of reacting with an isocyanate group and having a branching side chain.

In Aspects 1 and 2, the glycol component may be a glycol component denoted by general formula (I) or (II):

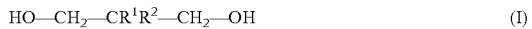
$$HO-CH_2-CR^1R^2-CH_2-OH \quad (I)$$

wherein, in general formula (I), each of $R^1$ and $R^2$ independently denotes a methyl group or ethyl group;

$$HO-CHR^3-CH_2-OH \quad (II)$$

wherein, in general formula (I), $R^3$ denotes a methyl group or ethyl group.

In Aspects 1 and 2, there may be a case where equal to or greater than 80 mole percent of the structural components in polyester polyol (A) is an aromatic dibasic acid, and 60 to 100 mole percent of the glycol component is a glycol denoted by general formula (I) or (II).

In Aspects 1 and 2, at least one of the magnetic layer and the nonmagnetic layer may further comprise at least one of a fatty acid and fatty acid ester.

The present invention can inhibit head grime resulting from fatty acid metal salts and thus enhance repeat running durability by incorporating organic acid B into the magnetic layer and/or nonmagnetic layer, and increase dispersion and thus ensure good magnetic layer surface properties by further employing organic acid A satisfying the relation pKa(A) <pKa(B), thereby making it possible to obtain a magnetic recording medium having excellent electromagnetic characteristics. Thus, the present invention can provide a magnetic recording medium affording both excellent electromagnetic characteristics and repeat running durability.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

The present invention includes two aspects, one of which, Aspect 1, relates to a magnetic recording medium comprising a nonmagnetic layer comprising a nonmagnetic powder and a binder and a magnetic layer comprising a ferromagnetic powder and a binder in this order on a nonmagnetic support, wherein the magnetic layer comprises organic acid A and organic acid B, with the acid strength pKa(A) of organic acid A and the acid strength pKa(B) of organic acid B satisfying the relation of pKa(A)<pKa(B), the other of which, Aspect 2, relates to a magnetic recording medium comprising a nonmagnetic layer comprising a nonmagnetic powder and a binder and a magnetic layer comprising a ferromagnetic powder and a binder in this order on a nonmagnetic support, wherein the nonmagnetic layer comprises organic acid A and organic acid B, with the acid strength pKa(A) of organic acid A and the acid strength pKa(B) of organic acid B satisfying the relation of pKa(A)<pKa(B).

Organic acid A is an unsaturated bond-containing organic acid comprising one substituent selected from the group consisting of a carboxyl group (—COOH), phosphoric acid group (—PO$_4$H$_2$), and a phosphonic acid group (—P(=O)(OH)$_2$) per molecule.

Organic acid B is an aliphatic or alicyclic organic acid in which two or more substituents substituted onto adjacent carbon atoms within the molecule are present per molecule, and at least one of the substituents is a carboxyl group.

Both Aspects 1 and 2 are sometimes collectively referred to as the "magnetic recording medium of the present invention" below.

The magnetic recording medium of the present invention comprises above-described organic acids A and B in either the magnetic layer or nonmagnetic layer, and may comprise organic acids A and B in both the magnetic layer and nonmagnetic layer. The reason the combined use of organic acids A and B makes it possible to obtain a magnetic recording medium affording excellent electromagnetic characteristics and repeat running durability is presumed by the present inventors to be as follows.

Organic acid A is thought to adsorb to the surface of the ferromagnetic powder or nonmagnetic powder, functioning to increase the compatibility of powder and binder and enhance dispersion. The characteristics of organic acid A and their effects are presumed to be as follows:

(1) One substituent selected from the group consisting of a carboxyl group, phosphoric acid group, and phosphonic acid group is contained per molecule: This substituent is required to cause organic acid A to adsorb to the surface of the ferromagnetic powder or nonmagnetic powder. Since it has a hydrophilic property, the incorporation of multiple substituents per molecule causes the surface of the ferromagnetic powder to become excessively hydrophilic, lowers affinity for the binder, and compromises dispersion. The substituent that is selected from among a carboxyl group, phosphoric acid group, and phosphonic acid group can adsorb forcefully to a basic point on the surface of the powder, thereby tending to prevent dissociation of organic acid A from the powder and contributing to dispersion.

(2) Containing an unsaturated bond: When an unsaturated bond is present within organic acid A, Π-Π interaction occurs at unsaturated bonds within the resin, increasing bonding strength and enhancing dispersion. When the unsaturated bond of organic acid A is contained in an aromatic heterocyclic ring or benzene ring, the Π-Π interaction is particularly strong and dispersion is particularly good. An aromatic heterocyclic ring is desirable in that it is an electron-withdrawing group, the effect of which is to increase the degree of acidity of the acid functional group contained in organic acid A, causing it to adsorb firmly to the ferromagnetic powder and enhance dispersion. In this regard, a pyridine ring is preferred.

Organic acid B can adsorb to the surface of the ferromagnetic powder, thereby inhibiting the reaction between the fatty acid or fatty acid ester (also referred to as the "lubricant component", hereinafter) and basic points on the powder. It also has a chelating effect, causing fatty acid metal salts that have been produced to revert to fatty acids and functioning to suppress the generation of fatty acid metal salts in the magnetic layer. The characteristics of organic acid B and their effects are presumed to be as follows:

(1) Two or more substituents substituted onto adjacent carbon atoms within the molecule are present per molecule: The term "chelating effect" means a form where one metal ion is bound by multiple functional groups so as to be enveloped. Being bound by a functional group within a single molecule is more stable in terms of entropy than being bound by functional groups in multiple molecules. Thus, organic acid B must have two or more substituents per molecule. Further, to form a stable chelate within a single molecule, the ring to which the chelate is bound should be stable. Five and six-membered rings formed by organic molecules are overwhelmingly stable. As set forth further below, at least one carboxyl group is contained as a substituent in organic acid B. For this carboxyl group to form a stable ring structure such as a six-membered ring, it must be substituted onto at least adjacent carbon atoms.

(2) An aliphatic or alicyclic organic acid: To have a molecular structure that is flexible and will readily form a chelate, organic acid B must be an aliphatic compound or an alicyclic compound.

(3) At least one of the above substituents is a carboxyl group: Carboxyl groups are strongly acidic and adsorb strongly to magnetic powder and metal cation components that have been released. Thus, at least one carboxyl group must be contained per molecule as a functional group to achieve a chelating effect.

As set forth above, the present invention is thought to increase dispersibility and thus enhance electromagnetic characteristics by means of organic acid A, and to inhibit the production of fatty acid metal salts and thus ensure repeat running durability by means of organic acid B. In this regard, organic acid A should preferentially adsorb to the magnetic powder to increase the compatibility of powder and binder. Conversely, since organic acid B is a multifunctional organic acid and is thus hydrophilic, excessive adsorption to the powder renders the surface of the ferromagnetic powder hydrophilic, reduces the affinity for binder, and causes dispersibility to deteriorate. That is, organic acid A should preferentially adsorb to the powder. One effective method of causing it to preferentially adsorb to the powder is to increase the degree of acidity of the organic acid, causing it to react strongly with the basic points of the powder. Accordingly, to make organic acid A preferentially adsorb to the powder, the acid strength (pKa) of organic acid A must be higher than that of organic acid B. Accordingly, in the present invention, two organic acids are combined for use so that the acid strength pKa(A) of organic acid A and the acid strength pKa(B) of organic acid B satisfy the relation pKa(A)<pKa(B).

The magnetic recording medium of the present invention will be described in greater detail below. In the present invention, organic acids A and B fall within the scope of the present invention both in a state of proton dissociation and in the form of salts.

Organic Acid A

Organic acid A is an unsaturated bond-containing organic acid comprising one substituent selected from the group consisting of a carboxyl group, a phosphoric acid group, and a phosphonic acid group per molecule.

Organic acid A desirably comprises an unsaturated bond in the form of a double bond, preferably comprising an unsaturated bond in an aromatic ring. Examples of the aromatic ring are the various aromatic rings comprised in Example compounds further below. Of these, pyridine rings, pyrazine rings, triazine rings, furan rings, thiophene rings, pyrrole rings, and other aromatic heterocyclic rings and benzene rings are desirable due to a dispersion-enhancing effect resulting from a strong Π-Π interaction with the binder. The above ring structure may be monocyclic, or may be in the form of a condensed ring. The number of unsaturated bonds contained in organic acid A is not specifically limited, so long as at least one such bond is present.

Organic acid A comprises one substituent selected from the group consisting of a carboxyl group, a phosphoric acid group, and a phosphonic acid group per molecule, and may also contain additional substituents. Such substituents are not specifically limited; examples are halogen atoms (such as fluorine atoms, chlorine atoms, bromine atoms, and iodine atoms), cyano groups, nitro groups, alkyl groups with 1 to 16 carbon atoms, alkenyl groups with 1 to 16 carbon atoms, alkynyl groups with 2 to 16 carbon atoms, halogen atom-substituted alkyl groups with 1 to 16 carbon atoms, alkoxy groups with 1 to 16 carbon atoms, acyl groups with 2 to 16 carbon atoms, alkylthio groups with 1 to 16 carbon atoms, acyloxy groups with 2 to 16 carbon atoms, alkoxycarbonyl groups with 2 to 16 carbon atoms, carbamoyl groups, carbamoyl groups substituted with alkyl groups having 2 to 16 carbon atoms, and acylamino groups having 2 to 16 carbon atoms. Desirable substituents are halogen atoms, cyano groups, alkyl groups with 1 to 6 carbon atoms, and halogen-atom substituted alkyl groups with 1 to 6 carbon atoms. Preferred substituents are halogen atoms, alkyl groups with 1 to 4 carbon atoms, and halogen atom-substituted alkyl groups with 1 to 4 carbon atoms. Halogen atoms, alkyl groups with 1 to 3 carbon atoms, and trifluoromethyl groups are of even greater preference. The number of such substituents per molecule is not specifically limited.

Specific examples of organic acid A will be given below. However, the present invention is not limited to the specific examples given below.

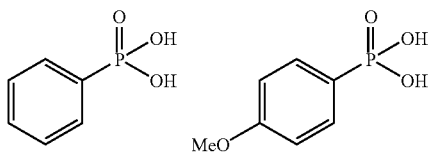

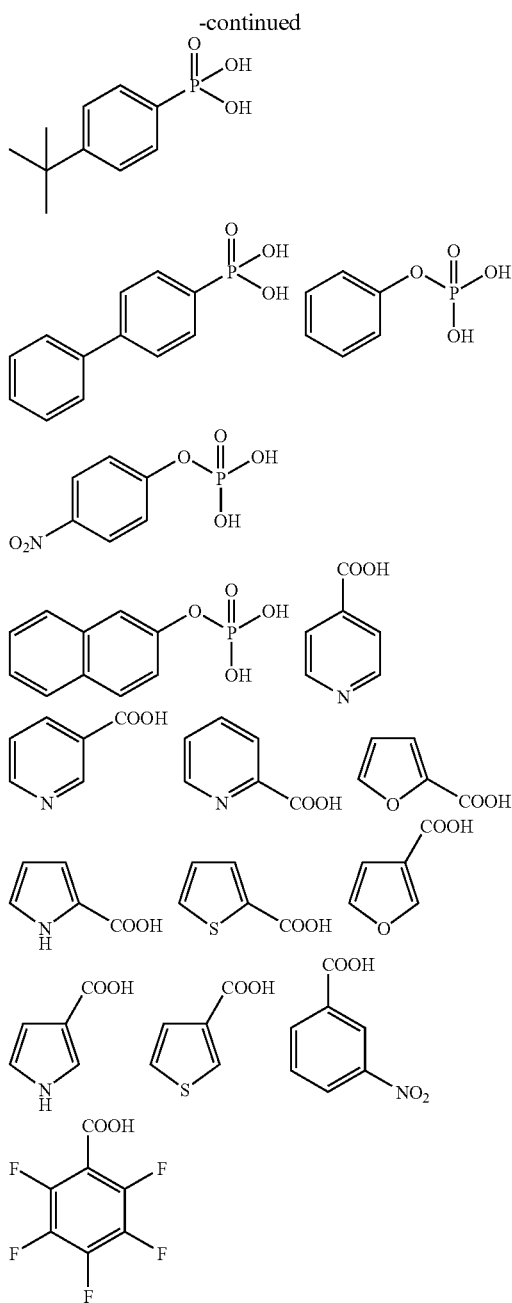

Organic Acid B

Organic acid B is an aliphatic or alicyclic organic acid in which two or more substituents substituted onto adjacent carbon atoms within the molecule are present per molecule and in which at least one of these substituents is a carboxyl group. One of the substituents substituted onto adjacent carbon atoms in the molecule is a carboxyl group, and other carboxyl groups can be contained in addition to this carboxyl group. Further, a hydroxyl group is desirable as a substituent in addition to the carboxyl group to effectively achieve a chelating effect. The number of substituents per molecule is not specifically limited so long as it is two or greater. For example, the number can be from about two to six. For organic acid B to effectively realize a chelating effect, excluding the embodiment where a hydroxyl group and a carboxyl group are present on a single carbon atom, it is undesirable for substituents in addition to the substituents substituted onto adjacent carbon atoms to be present within the molecule.

Organic acid B is an aliphatic or an alicyclic compound in which, excluding substituents, there are for example 2 to 8, preferably 2 to 6, carbon atoms on the skeletal portion. Further, the skeletal portion of organic acid B is desirably comprised of just saturated bonds, with no unsaturated bonds. This is because when unsaturated bonds are present, affinity for the binder increases, sometimes impeding the formation of chelates.

Specific examples of organic acid B will be given below. However, the present invention is not limited to the specific examples.

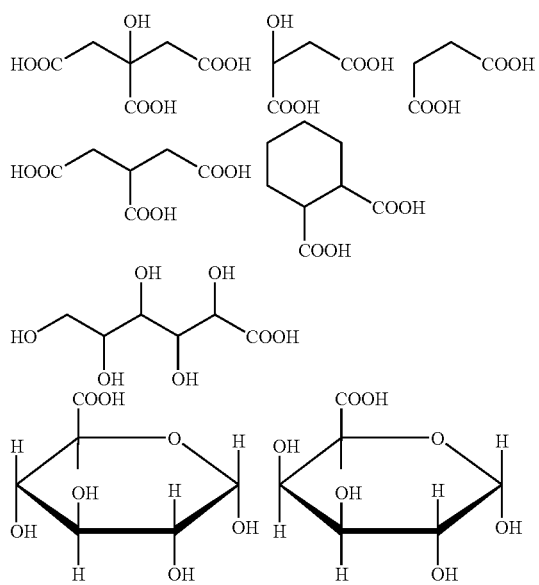

For the above reasons, organic acid A and organic acid B are employed in a combination such that the acid strength pKa(A) of organic acid A and the acid strength pKa(B) of organic acid B satisfy the relation pKa(A)<pKa(B). From the perspective of causing organic acid A to preferentially adsorb to the surface of the powder, the difference between pKa(A) and pKa(B) is desirably equal to or greater than 0.2, preferably equal to or greater than 0.5. The upper limit of the difference is not specifically limited, but taking into account the acid strength of organic acids A and B that are available, is about equal to or less than 3.0, for example. The acid strength pKa(A) of organic acid A is about 3.00 to 5.50, for example, and the acid strength pKa(B) of organic acid B is greater than 5.00 to about 6.50, for example. However, it suffices for the relation pKa(A)<pKa(B) to be satisfied, and they are not limited to within these ranges.

In the present invention, the term "acid strength" refers to a value that is measured by the following method.

A 50 mg sample of organic acid A or B is dissolved in a mixed solution of 20 mL of water and 30 mL of tetrahydrofuran. Titration to neutral is conducted using a model GT-100 Win automatic titrator made by Mitsubishi Chemical Analytech with 0.1N NaOH (Wako Pure Chemical Industries). The pH corresponding to half of the titration quantity that is added dropwise to attain the neutralization point is read, and that pH is adopted as the acid strength.

Organic acids A and B employed in the present invention can all be synthesized by known methods, and many are commercially available.

The quantities added and mixing ratio of organic acids A and B can be suitably adjusted based on the specific surface area and on the number of basic points (sites where organic acid and lubricant components adsorb) present on the surface of the powder employed. The examples of a ferromagnetic powder and a nonmagnetic powder with specific surface areas of 10 to 150 $m^2/g$ by the BET method are given below.

The quantity of organic acid A that is added is desirably equal to or greater than 0.5 weight part and equal to or less than 10 weight parts, preferably equal to or greater than 0.5 weight part and equal to or less than 7.5 weight parts, and optimally, equal to or greater than 0.5 weight part and equal to or less than 5.0 weight parts, per 100 weight parts of ferromagnetic powder or nonmagnetic powder. When the quantity of organic acid A that is added is equal to or greater than 0.5 weight part, it is possible to ensure dispersibility and increase the surface smoothness of the medium, permitting good electromagnetic characteristics. When the quantity of organic acid A that is added is equal to or less than 10 weight parts, it is possible to ensure a suitable degree of packing of the magnetic layer and achieve good electromagnetic characteristics. When the quantity of organic acid A that is added is excessive, excessive acid corrosion occurs, powder characteristics deteriorate, an excessive level of metal cations producing fatty acid metal salts is produced, the inhibiting effect of organic acid B on fatty acid metal salts is inadequate, and deterioration in the error rate may occur due to increased head grime. However, equal to or less than 10 weight parts is desirable in that such phenomena do not occur.

The quantity of organic acid B that is added is desirably equal to or greater than 0.5 weight parts and equal to or less than 5.0 weight parts, preferably equal to or greater than 0.5 weight part and equal to or less than 4.0 weight parts, and optimally, equal to or greater than 0.5 weight part and equal to or less than 3.0 weight parts, per 100 weight parts of ferromagnetic powder or nonmagnetic powder. When the quantity of organic powder B that is added is equal to or greater than 0.5 weight part, generation of fatty acid metal salts can be effectively inhibited, head grime can be decreased, and a good error rate can be ensured. When the quantity of organic acid B that is added is excessive, adsorption to the surface of the ferromagnetic powder or nonmagnetic powder renders the surface excessively hydrophilic and lowers affinity for the binder, making it impossible to ensure dispersibility, causing deterioration of the surface properties of the medium, and sometimes compromising electromagnetic characteristics. However, equal to or less than 5.0 weight parts are desirable because such phenomena do not occur.

As regards the quantities of organic acids A and B that are added, when the weights of organic acid A and B contained in the magnetic layer or nonmagnetic layer are denoted as a and b, respectively, a/b is desirably equal to or greater than 0.1 and equal to or less than 20, preferably equal to or greater than 0.13 and equal to or less than 15, and optimally, equal to or greater than 0.15 and equal to or less than 10. When a/b is less than 0.1, that is, when the ratio of organic acid B becomes relatively high, even when organic acids are employed that satisfy the relation of pKa(A)<pKb(B), the adsorption of organic acid B to the surface of the ferromagnetic powder or nonmagnetic powder will be excessive, rendering the surface hydrophilic, making it difficult to ensure dispersibility by lowering the affinity to binder, causing the surface properties of the medium to deteriorate, and sometimes compromising electromagnetic characteristics. Conversely, when a/b exceeds 20, that is, when the ratio of organic acid A becomes relatively high, excessive corrosion may occur due to the acid in organic acid A, causing deterioration in the characteristics of the powder, causing an excessive level of metal cations forming fatty acid metal salts to be produced, causing the inhibiting effect of organic acid B on fatty acid metal salts to be inadequate, and there may be a case where deterioration in the error rate occurs due to an increase in head grime.

Binder

Binders that are desirable for use with organic acids A and B will be described next.

To create strong affinity of organic acid A for binder through Π-Π interaction, promote adsorption of binder to ferromagnetic powder or nonmagnetic powder, and heighten dispersibility, the binder desirably comprises an aromatic ring component. Examples of aromatic ring components are the various aromatic rings contained in the structural components of the polyurethane described further below.

The present invention can enhance repeat running durability by reducing the substances (fatty acid metal salts) causing head grime by means of organic acid B. A synergistic effect in enhancing repeat running durability can be achieved when the glass transition temperature of the binder that is combined is high. To achieve such an effect, the glass transition temperature of the binder employed is desirably equal to or higher than 75° C. When the glass transition temperature of the binder is equal to or higher than 75° C., softening of the binder due to frictional heat generated by sliding of the medium against the head tends not to occur, adhesion of the binder to the head tends not to take place, and head grime can be effectively inhibited. However, when the glass transition temperature of the binder is excessively high, its solubility in solvent decreases, powder dispersibility diminishes, and the effect of processing to smooth the surface by applying heat and pressure to the medium, known as calendering, decreases, potentially compromising medium smoothness. Thus, the glass transition temperature of the binder is desirably equal to or lower than 150° C. That is, the glass transition temperature of the binder desirably falls within a range of 75 to 150° C. The glass transition temperature of the binder in the present invention refers to the maximum loss elasticity modulus in dynamic viscoelasticity measurement, and is a value that can be measured by the following method, for example.

A binder in the form of a polymer solution is coated to a thickness of 30 μm on an aramid base (made by Asahi Kasei Corporation) and dried at 140° C. under vacuum for three hours. The film is punched to a size of 3.35 mm×60.0 mm to prepare a glass transition temperature measurement sample. The sample is subjected to dynamic viscoelasticity measurement with a Vibron dynamic viscoelasticity measuring device, Model RHEO-2000 (TOYO BACDWIN), and the point of inflection in temperature of the loss elastic modulus (E") is adopted as the glass transition temperature.

If the binder comprises a polar group, a basic point on the powder surface will react with the polar group, promoting adsorption of the binder to the powder surface and enhancing dispersion. Thus, a binder containing a polar group within its molecular structure is desirable. Examples of such polar groups are one or more polar groups selected from among —COOM, —SO₃M, —OSO₃M, —P=O(OM)₂, —O—P=O(OM)₂ (wherein M denotes a hydrogen atom or an alkali metal salt), —OH, —NR₂, —N⁺R₃ (where R denotes a hydrocarbon group), epoxy group, —SH, —CN, and the like. These polar groups can be incorporated into the binder by copolymerization or by an addition reaction. The quantity of polar groups in the binder is, for example, $10^{-1}$ to $10^{-8}$ mol/g, preferably $10^{-2}$ to $10^{-6}$ mol/g. From the perspective of affinity for powder, a sulfonic acid (salt) group-containing binder is desirable as the binder employed with organic acids A and B. In the present invention, the term "sulfonic acid (salt) group" includes the sulfonic acid group (—SO₃H) and sulfonate groups (SO₃M': M' being lithium, sodium, potassium, or some other alkali metal atom).

A specific example of a desirable binder is a polyester polyurethane in the form of the reaction product of a polyester polyol (A) comprising structural components in the form of a dibasic acid and a glycol component, an aromatic isocyanate (B), and a compound (C) with a molecular weight of less than 1,000 having two or more functional groups per molecule that are capable of reacting with an isocyanate group and having a branching side chain.

Examples of the dibasic acid component constituting polyester polyol (A) are succinic acid, adipic acid, sebacic acid, azelaic acid, 1,2-cyclohexanedicarboxylic acid, 1,3-cyclohexanedicarboxylic acid, 1,4-cyclohexanedicarboxylic acid, phthalic acid, isophthalic acid, terephthalic acid, naphthalenedicarboxylic acid, 4,4'-diphenyldicarboxylic acid, 4,4'-diphenyletherdicarboxylic acid, and other carboxylic acids. Of these, the aromatic dibasic acids are desirable. Further, among all of the acid components, sulfonic acid metal salt-containing aromatic dicarboxylic acids such as sodium 5-sulfoisophthalate, potassium 5-sulfoisophthalate, sodium sulfoterephthalate, and potassium sulfoterephthalate, and sulfonic acid (salt) group-containing components in which the sites of these carboxylic acids have been esterified, can be copolymerized. To obtain a binder of high compatibility with organic acid A, equal to or greater than 80 mole percent of the structural components in polyester polyol (A) are desirably in the form of an aromatic dibasic acid.

From the perspectives of coating strength and dispersion properties, a glycol denoted by general formula (I) or (II) below is desirable as the glycol component constituting polyester polyol (A).

$$\text{HO—CH}_2\text{—CR}^1\text{R}^2\text{—CH}_2\text{—OH} \quad (I)$$

In general formula (I), each of $R^1$ and $R^2$ independently denotes a methyl group or ethyl group.

$$\text{HO—CHR}^3\text{—CH}_2\text{—OH} \quad (II)$$

In general formula (I), $R^3$ denotes a methyl group or ethyl group.

Specific examples of the glycol denoted by general formula (I) or (II) are: 1,2-propylene glycol, 1,2-butylene glycol, and neopentyl glycol.

Glycol components other than the components denoted by general formulas (I) and (II) may be incorporated as glycol components constituting polyester polyol (A). However, 60 to 100 mole percent of the glycol components are desirably glycols denoted by general formula (I) or (II). Examples of other glycol components are: ethylene glycol, 1,3-propanediol, 2-methyl-1,3-propanediol, 1,3-butylene glycol, 1,4-butanediol, 1,5-pentanediol, 1,6-hexanediol, 1,9-nonanediol, 1,10-dodecanediol, diethylene glycol, triethylene glycol, dipropylene glycol, 2-butyl-2-ethyl-1,3-propanediol, 2-methyl-1,3-propanediol, 3-methyl-1,5-pentanediol, 2,2,4-trimethyl-1,3-pentanediol, 2-methylocatnediol, neopentylhydroxypivalic acid ester, 1,4-cyclohexanedimethanol, 1,3-cyclohexanedimethanol, 1,2-cyclohexanedimethanol, tricyclodecanedimethanol, hydrogenated bisphenol A, alkylene oxide adducts of hydrogenated bisphenol A, polytetramethylene glycol, polypropylene glycol, polyethylene glycol, and other polyether polyols. Of these, ethylene glycol, 1,3-propanediol, 1,5-pentanediol, neopentylhydroxypivalic acid esters, 2-butyl-2-ethyl-1,3-propanediol, 1,4-cyclohexane dimethanol, tricyclodecanedimethanol, and hydrogenated bisphenol A are desirable. Further, trimellitic anhydride, glycerin, trimethylol propane, pentaerythritol, and other trifunctional or greater compounds can be employed as part of the starting material of the polyester diol to the extent that the characteristic of the polyester polyol being soluble in organic solvent is not lost.

An aromatic polyisocyanate comprising an aromatic ring and two or more isocyanate groups per molecule is desirable as aromatic isocyanate (B). Specific examples are: 2,4-trilene diisocyanate, 2,6-trilene diisocyanate, p-phenylene diisocyanate, 4,4'-diphenylmethane diisocyanate, m-phenylene diisocyanate, 3,3'-dimethoxy-4,4'-biphenylene diisocyanate, 2,6-naphthalene diisocyanate, 3,3'-dimethyl-4,4'-biphenylene diisocyanate, 4,4'-diphenylene diisocyanate, 4,4'-diisocyanate diphenyl ether, 1,5-naphthalene diisocyanate, and m-xylene diisocyanate. Of these, 4,4'-diphenylmethane diisocyanate is desirable.

The following components are examples of compound (C) with a molecular weight of less than 1,000 having two or more functional groups capable of reacting with anb isocyanate group per molecule and having a branching side chain. Specific examples are: 1,2-propylene glycol, 1,3-propanediol, 1,2-butylene glycol, 1,3-butylene glycol, 2,3-butylene glycol, 2,2-dimethyl-1,3-propanediol, 3-methyl-1,5-pentanediol, 2,2,4-trimethyl-1,3-pentanediol, 2-ethyl-1,3-hexanediol, 2,2-dimethyl-3-hydroxypropyl-2,2'-dimethyl-3-hydroxypropanate, 2-normalbutyl-2-ethyl-1,3-propanediol, 3-ethyl-1,5-pentanediol, 3-propyl-1,5-pentane diol, 2,2-diethyl-1,3-propanediol, 3-octyl-1,5-pentanediol, 3-phenyl-1,5-pentanediol, and 2,5-dimethyl-3-sodiumsulfo-2,5-hexanediol. Of these, 2,2-dimethyl-1,3-propanediol, 2,2-dimethyl-3-hydroxypropyl-2,2'-dimethyl-3-hydroxypropanate, 2-normalbutyl-2-ethyl-1,3-propanediol, and 2,2-diethyl-1,3-propanediol are preferred. A compound having a polar group can also be employed as compound (C). Examples thereof are polyester diols having number average molecular weights of equal to or lower than 1,000, obtained from sodium 5-sulfoisophthalate, potassium 5-sulfoisophthalate, sodium sulfoterephthalate, potassium sulfoterephthalate, and other sulfonic acid metal salt-containing aromatic dicarboxylic acids and esters thereof, and glycols comprising side chains. Specific examples are ester condensates comprised of sodium 5-sulfoisophthalate dimethyl ester and 2,2-dimethyl-3-hydroxypropyl-2',2'-dimethyl-3-hydroxypropanate and ester condensates comprised of sodium 5-sulfoisophthalate dimethyl ester and neopentyl glycol.

The polyester polyurethane that is the reaction product of polyester polyol (A), aromatic isocyanate (B), and compound (C) can be obtained by copolymerizing (A) through (C) by known methods. Aromatic isocyanate (B) is desirably copolymerized in a quantity of 5 to 120 weight parts per 100 weight parts of polyester polyol (A). The quantity of compound (C) that is copolymerized is desirably kept within a range such that the urethane group concentration of the polyurethane obtained does not exceed $4.0 \times 10^{-3}$ mole/g. Although the mechanical properties as urethane can be further enhanced when the urethane group concentration exceeds $4.0 \times 10^{-3}$ mole/g, solubility in generally employed solvents sometimes decreases. The urethane group concentration can be adjusted by means of the quantity of compound (C), which is a branching compound, and the molecular weight of polyester polyol (A). The unit is the number of moles per gram (moles/g) of polyurethane. The urethane group concentration is calculated as follows.

(((Weight of aromatic isocyanate(B)×2)/(weight of polyester polyol(A)+weight of aromatic isocyanate(B)+weight of compound(C)))/molecular weight of aromatic isocyanate(B))=urethane group concentration(unit: mol/g).

The number average molecular weight of the polyester polyurethane that is the reaction product of (A) through (C) above is desirably 1,000 to 200,000, preferably 10,000 to 100,000. The weight average molecular weight thereof is desirably 20,000 to 400,000, preferably 20,000 to 200,000.

Just the polyester polyurethane that is the reaction product of (A) through (C) above can be employed as the binder component in the magnetic layer and/or nonmagnetic layer, or it can be employed in combination with another binder component, described further below. When employed with another binder component, the polyester polyurethane desirably accounts for equal to or more than 10 weight percent, preferably 15 to 75 weight percent, of the total weight of binder, including curing agent, in each layer.

During preparation of the magnetic layer coating liquid and nonmagnetic layer coating liquid, the order in which organic acids A and B, the binder, and the powder are added is not specifically limited. Organic acids A and B, the binder, and the powder, and various additives that are added as needed may be simultaneously or sequentially added.

The magnetic layer, nonmagnetic layer, and the like of the magnetic recording medium of the present invention will be described in greater detail below.

Magnetic Layer

The magnetic layer comprise a ferromagnetic powder and a binder. In the magnetic recording medium of Aspect 1, the magnetic layer contains organic acids A and B in addition to ferromagnetic powder and binder. In Aspect 2, the addition of organic acids A and B to the magnetic layer coating liquid is not required, but since organic acids A and B are contained in the nonmagnetic layer, organic acids A and B will sometimes be present in the magnetic layer as the result of migration from the nonmagnetic layer. In Aspect 2, it is desirable to add an additive (dispersing agent), preferably organic acid A, to enhance dispersion in the magnetic layer coating liquid during at least preparation of the magnetic layer coating liquid. This is to enhance dispersion of the ferromagnetic powder during preparation of the magnetic layer coating liquid, thereby ensuring a smooth surface on the magnetic layer. Accordingly, in Aspect 2, a dispersing agent is desirably contained, and organic acid A is preferably contained, in the magnetic layer. The quantity of organic acid A that is added in this case can be set within the above-described desirable range.

Any ferromagnetic powder that is commonly employed in the magnetic layer of a magnetic recording medium can be employed as the ferromagnetic powder. Examples of ferromagnetic powders that are desirable for combination with organic acids A and B are hexagonal ferrite powders and ferromagnetic metal powders. From the perspective of attaining a good effect in combination with organic acids A and B, the specific surface area of both of these types of ferromagnetic powders as measured by BET is desirably 10 to 150 $m^2/g$, preferably 20 to 120 $m^2/g$, more preferably 45 to 100 $m^2/g$, and still more preferably, 50 to 80 $m^2/g$.

Hexagonal ferrite powder and ferromagnetic metal powder will be described in greater detail below.

(i) Hexagonal Ferrite Powder

Examples of hexagonal ferrite powders are barium ferrite, strontium ferrite, lead ferrite, calcium ferrite, and various substitution products thereof such as Co substitution products. Specific examples are magnetoplumbite-type barium ferrite and strontium ferrite; magnetoplumbite-type ferrite in which the particle surfaces are covered with spinels; and magnetoplumbite-type barium ferrite, strontium ferrite, and the like partly comprising a spinel phase. The following may be incorporated into the hexagonal ferrite powder in addition to the prescribed atoms: Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb and the like. Compounds to which elements such as Co—Zn, Co—Ti, Co—Ti—Zr, Co—Ti—Zn, Ni—Ti—Zn, Nb—Zn—Co, Sb—Zn—Co, and Nb—Zn have been added may generally also be employed. They may comprise specific impurities depending on the starting materials and manufacturing methods employed.

As the hexagonal ferrite powder, those having an average plate diameter ranging from 10 to 50 nm are desirably employed. The average plate diameter preferably ranges from 15 to 40 nm, more preferably 15 to 30 nm. The hexagonal ferrite powder with the above size is suitable for use in magnetic recording media for high-density recording. According to the present invention, the dispersibility of microgranular hexagonal ferrite powders such as those with the above-described average plate diameter can be improved.

An average plate ratio [arithmetic average of (plate diameter/plate thickness)] preferably ranges from 1 to 15, more preferably 1 to 7. When the average plate diameter ranges from 1 to 15, adequate orientation can be achieved while maintaining high filling property, as well as increased noise due to stacking between particles can be suppressed.

Narrow distributions of particle plate diameter and plate thickness of the hexagonal ferrite powder are normally good. About 500 particles can be randomly measured in a transmission electron microscope (TEM) photograph of particles to measure the particle plate diameter and plate thickness, as set forth above. The distributions of particle plate diameter and plate thickness are often not a normal distribution. However, when expressed as the standard deviation to the average size, σ/average size may be 0.1 to 1.0. The particle producing reaction system is rendered as uniform as possible and the particles produced are subjected to a distribution-enhancing treatment to achieve a narrow particle size distribution. For example, methods such as selectively dissolving ultrafine particles in an acid solution by dissolution are known. The pH of the hexagonal ferrite powder is normally about 4 to 12 and usually optimum for the dispersion medium and polymer. From the perspective of the chemical stability and storage properties in the medium, a pH of about 6 to 11 can be selected. Moisture contained in the hexagonal ferrite powder also affects dispersion. The moisture content is usually optimum for the dispersion medium and polymer, normally within a range of 0.01 to 2.0.

Methods of manufacturing the hexagonal ferrite powder include: (1) a vitrified crystallization method consisting of mixing into a desired ferrite composition barium oxide, iron oxide, and a metal oxide substituting for iron with a glass forming substance such as boron oxide; melting the mixture; rapidly cooling the mixture to obtain an amorphous material; reheating the amorphous material; and refining and comminuting the product to obtain a barium ferrite crystal powder; (2) a hydrothermal reaction method consisting of neutralizing a barium ferrite composition metal salt solution with an alkali; removing the by-product; heating the liquid phase to equal to or greater than 100° C.; and washing, drying, and comminuting the product to obtain barium ferrite crystal powder; and (3) a coprecipitation method consisting of neutralizing a barium ferrite composition metal salt solution with an alkali; removing the by-product; drying the product and processing it at equal to or less than 1,100° C.; and comminuting the product to obtain barium ferrite crystal powder. The hexagonal ferrite powder employed in the present invention can be manufactured by any manufacturing method. As needed, the hexagonal ferrite powder can be surface treated with Al, Si, P, or an oxide thereof. The quantity can be set to 0.1 to 10 weight percent of the hexagonal ferrite powder. When applying a surface treatment, the quantity of a lubricant such as a fatty acid that is adsorbed is desirably not greater than 100 mg/m$^2$. The hexagonal ferrite powder will sometimes contain inorganic ions such as soluble Na, Ca, Fe, Ni, or Sr. These are desirably substantially not present, but seldom affect characteristics at equal to or less than 200 ppm.

(ii) Ferromagnetic Metal Powder

The ferromagnetic metal powder employed is not specifically limited, but preferably a ferromagnetic metal power comprised primarily of α-Fe. In addition to prescribed atoms, the following atoms can be contained in the ferromagnetic metal powder: Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B and the like. Particularly, incorporation of at least one of the following in addition to α-Fe is desirable: Al, Si, Ca, Y, Ba, La, Nd, Co, Ni, and B. Incorporation of at least one selected from the group consisting of Co, Y and Al is particularly preferred. The Co content preferably ranges from 0 to 40 atom percent, more preferably from 15 to 35 atom percent, further preferably from 20 to 35 atom percent with respect to Fe. The content of Y preferably ranges from 1.5 to 12 atom percent, more preferably from 3 to 10 atom percent, further preferably from 4 to 9 atom percent with respect to Fe. The Al content preferably ranges from 1.5 to 12 atom percent, more preferably from 3 to 10 atom percent, further preferably from 4 to 9 atom percent with respect to Fe.

The ferromagnetic metal powder may contain a small quantity of hydroxide or oxide. Ferromagnetic metal powders obtained by known manufacturing methods may be employed. The following are examples of methods of manufacturing ferromagnetic metal powders: methods of reduction with compound organic acid salts (chiefly oxalates) and reducing gases such as hydrogen; methods of reducing iron oxide with a reducing gas such as hydrogen to obtain Fe or Fe—Co particles or the like; methods of thermal decomposition of metal carbonyl compounds; methods of reduction by addition of a reducing agent such as sodium boron hydride, hypophosphite, or hydrazine to an aqueous solution of ferromagnetic metal; and methods of obtaining powder by vaporizing a metal in a low-pressure inert gas. Any one from among the known method of slow oxidation, that is, immersing the ferromagnetic metal powder thus obtained in an organic solvent and drying it; the method of immersing the ferromagnetic metal powder in an organic solvent, feeding in an oxygen-containing gas to form a surface oxide film, and then conducting drying; and the method of adjusting the partial pressures of oxygen gas and an inert gas without employing an organic solvent to form a surface oxide film, may be employed.

The crystallite size of the ferromagnetic metal powder is preferably 40 to 180 Angstroms, more preferably 40 to 150 Angstroms, and still more preferably, 40 to 110 Angstroms. The average major axis length (average particle size) of the ferromagnetic metal powder preferably ranges from 10 to 50 nm, more preferably 10 to 40 nm, and further preferably 15 to 30 nm. According to the present invention, the dispersibility of microgranular ferromagnetic metal powders such as those with the above-described average major axis length can be improved. The acicular ratio of the ferromagnetic metal powder is preferably equal to or greater than 3 and equal to or less than 15, more preferably equal to or greater than 3 and equal to or less than 12.

The moisture content of the ferromagnetic metal powder preferably ranges from 0.01 to 2 weight percent. The moisture content of the ferromagnetic metal powder is desirably optimized based on the type of binder. The pH of the ferromagnetic metal powder is desirably optimized depending on what is combined with the binder. A range of 4 to 12 can be established, with 6 to 10 being preferred. As needed, the ferromagnetic metal powder can be surface treated with Al, Si, P, or an oxide thereof. The quantity can be set to 0.1 to 10 weight percent of the ferromagnetic metal powder. When applying a surface treatment, the quantity of a lubricant such as a fatty acid that is adsorbed is desirably not greater than 100 mg/m$^2$. The ferromagnetic metal powder will sometimes contain inorganic ions such as soluble Na, Ca, Fe, Ni, or Sr. These are desirably substantially not present, but seldom affect characteristics at equal to or less than 200 ppm. The ferromagnetic metal powder employed in the present invention desirably has few voids; the level is preferably equal to or less than 20 volume percent, more preferably equal to or less than 5 volume percent. As stated above, so long as the particle size characteristics are satisfied, the ferromagnetic metal powder may be acicular, rice grain-shaped, or spindle-shaped.

The average size of the ferromagnetic powder can be measured by the following method.

The particles of ferromagnetic powder are photographed at a magnification of about 100,000-fold with a model H-9000 transmission electron microscope made by Hitachi and printed on photographic paper at a total magnification of about 500,000-fold to obtain particle photographs. The targeted magnetic material is selected from the particle photographs, the contours of the powder material are traced with a digitizer, and the size of the particles is measured with KS-400 image analyzer software from Carl Zeiss. The size of 500 particles is measured. The average value of the particle size measured by the above method can be applied as the average size of the ferromagnetic powder.

The size of a powder such as the magnetic material (referred to as the "powder size" hereinafter) in the present invention is denoted: (1) by the length of the major axis constituting the powder, that is, the major axis length, when the powder is acicular, spindle-shaped, or columnar in shape (and the height is greater than the maximum major diameter of the bottom surface); (2) by the maximum major diameter of the tabular surface or bottom surface when the powder is tabular or columnar in shape (and the thickness or height is smaller than the maximum major diameter of the tabular surface or bottom surface); and (3) by the diameter of an equivalent circle when the powder is spherical, polyhedral, or of unspecified shape and the major axis constituting the powder cannot be specified based on shape. The "diameter of an equivalent circle" refers to that obtained by the circular projection method.

The average powder size of the powder is the arithmetic average of the above powder size and is calculated by measuring five hundred primary particles in the above-described method. The term "primary particle" refers to a nonaggregated, independent particle.

The average acicular ratio of the powder refers to the arithmetic average of the value of the (major axis length/minor axis length) of each powder, obtained by measuring the length of the minor axis of the powder in the above measurement, that is, the minor axis length. The term "minor axis length" means the length of the minor axis constituting a powder for a powder size of definition (1) above, and refers to the thickness or height for definition (2) above. For (3) above, the (major axis length/minor axis length) can be deemed for the sake of convenience to be 1, since there is no difference between the major and minor axes.

When the shape of the powder is specified, for example, as in powder size definition (1) above, the average powder size refers to the average major axis length. For definition (2) above, the average powder size refers to the average plate diameter, with the arithmetic average of (maximum major diameter/thickness or height) being referred to as the average plate ratio. For definition (3), the average powder size refers to the average diameter (also called the average particle diameter).

Binder

The binder that is desirably employed in combination with organic acids A and B is as set forth above. However, it is also possible to employ a binder other than the above-described binder in the present invention. Conventionally known thermoplastic resins, thermosetting resins, reactive resins and mixtures thereof may be employed as binders used. The thermoplastic resins suitable for use have a glass transition temperature of −100 to 150° C., a number average molecular weight of 1,000 to 200,000, preferably from 10,000 to 100,000, and have a degree of polymerization of about 50 to 1,000.

Examples thereof are polymers and copolymers comprising structural units in the form of vinyl chloride, vinyl acetate, vinyl alcohol, maleic acid, acrylic acid, acrylic acid esters, vinylidene chloride, acrylonitrile, methacrylic acid, methacrylic acid esters, styrene, butadiene, ethylene, vinyl butyral, vinyl acetal, and vinyl ether; polyurethane resins; and various rubber resins. Further, examples of thermosetting resins and reactive resins are phenol resins, epoxy resins, polyurethane cured resins, urea resins, melamine resins, alkyd resins, acrylic reactive resins, formaldehyde resins, silicone resins, epoxy polyamide resins, mixtures of polyester resins and isocyanate prepolymers, mixtures of polyester polyols and polyisocyanates, and mixtures of polyurethane and polyisocyanates. These resins are described in detail in *Handbook of Plastics* published by Asakura Shoten, which is expressly incorporated herein by reference in its entirety. It is also possible to employ known electron beam-cured resins. Examples and manufacturing methods of such resins are described in Japanese Unexamined Patent Publication (KOKAI) Showa No. 62-256219, which is expressly incorporated herein by reference in its entirety. The above-listed resins may be used singly or in combination. Preferred resins are polyurethane resin, combinations of polyurethane resin and at least one member selected from the group consisting of vinyl chloride resin, vinyl chloride—vinyl acetate copolymers, vinyl chloride—vinyl acetate—vinyl alcohol copolymers, and vinyl chloride—vinyl acetate—maleic anhydride copolymers, as well as combinations of the same with polyisocyanate. Resins suitable for use as binder can be synthesized by known methods, and may be commercially available.

Known polyurethane resins may be employed, such as polyester polyurethane, polyether polyurethane, polyether polyester polyurethane, polycarbonate polyurethane, polyester polycarbonate polyurethane, and polycaprolactone polyurethane. A binder obtained by incorporating as needed one or more polar groups described above into any of the above-listed binders by copolymerization or addition reaction to improve dispersion properties and durability is desirably employed. The quantity of such a polar group ranges, for example, from $10^{-1}$ to $10^{-8}$ mol/g, preferably from $10^{-2}$ to $10^{-6}$ mol/g.

The quantity of binder employed in the magnetic layer ranges from, for example, 5 to 50 weight percent, preferably from 10 to 30 weight percent, relative to the weight of the ferromagnetic powder. When employing vinyl chloride resin, the quantity of binder added is preferably from 5 to 30 weight percent; when employing polyurethane resin, from 2 to 20 weight percent; and when employing polyisocyanate, from 2 to 20 weight percent. They may be employed in combination. However, for example, when head corrosion occurs due to the release of trace amounts of chlorine, polyurethane alone or just polyurethane and isocyanate may be employed.

Examples of polyisocyanates are tolylene diisocyanate, 4,4'-diphenylmethane diisocyanate, hexamethylene diisocyanate, xylylene diisocyanate, napthylene-1,5-diisocyanate, o-toluidine diisocyanate, isophorone diisocyanate, triphenylmethane triisocyanate, and other isocyanates; products of these isocyanates and polyalcohols; polyisocyanates produced by condensation of isocyanates; and the like. They are commercially available, and can be used in each layer singly or in combinations of two or more by exploiting differences in curing reactivity.

As needed, additives can be added to the magnetic layer and the nonmagnetic layer described further below, such as those normally employed in the magnetic recording medium, for example, abrasives, lubricants, antifungal agents, antistatic agents, oxidation inhibitors, solvents, and carbon black. Since organic acid B can suppress the generation of fatty acid metal salt in the system comprising a fatty acid and/or fatty acid ester, organic acid B is desirably employed in the magnetic recording medium comprising a fatty acid and/or fatty acid ester. Examples of the fatty acid are capric acid, caprylic acid, lauric acid, myristic acid, pulmitic acid, stearic acid, behenic acid, oleic acid, elaidic acid, linoleic acid, linolenic acid, and isostearic acid. Examples of the fatty acid ester are butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentyl glycol didecanoate, ethylene glycol dioleyl. These fatty acids and fatty acid esters can function as a lubricant to enhance a lubricating property by adding to the magnetic layer and/or the nonmagnetic layer. The type, quantity and combined ratio of the lubricant to produce a synergetic effect can be suitably set based on the objective. For example, it is possible to control seepage onto the surface by employing fatty acids of different boiling points, or by employing esters of different boiling points, melting points or polarity in the nonmagnetic layer and magnetic layer. However, the control method is not limited thereto. In general, the total amount of the lubricant is, for example, 0.1 to 50 weight percent, preferably 2 to 25 weight percent, relative to the ferromagnetic powder or nonmagnetic powder, All or some part of the additives employed in the present invention can be added in any of the steps during the manufacturing of coating liquids for the magnetic layer and nonmagnetic layer. For example, there are cases where they are mixed with the ferromagnetic powder prior to the kneading step; cases where they are added during the step in which the ferromagnetic powder, binder, and solvent are kneaded; cases where they are added during the dispersion step; cases where they are added after dispersion; and cases where they are added directly before coating. Depending on the objective, there may be a case where all or some part of additives can be coated simultaneously or successively following the coating of the magnetic layer to achieve the objective. Alternatively, depending on the objective, the lubricant can be coated on the surface of the magnetic layer following calendaring or slitting. Known organic solvents can be employed in the present invention, for example, those described in Japanese Unexamined Patent Publication (KOKAI) Showa No. 6-68453, which is expressly incorporated herein by reference in its entirety.

Nonmagnetic Layer

The nonmagnetic layer comprises a nonmagnetic powder and a binder. The nonmagnetic powder may be an organic or inorganic substance. Carbon black and the like may also be employed. Examples of inorganic substances are: metals, metal oxides, metal carbonates, metal sulfates, metal nitrides, metal carbides, and metal sulfides. Surface modifying effects can be effectively applied to nonmagnetic metal powders.

Specifically, titanium oxides such as titanium dioxide, cerium oxide, tin oxide, tungsten oxide, $ZnO$, $ZrO_2$, $SiO_2$, $Cr_2O_3$, $\alpha$-alumina with an $\alpha$-conversion rate of 90 to 100 percent, $\beta$-alumina, $\gamma$-alumina, $\alpha$-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide may be employed singly or in combinations of two or more. $\alpha$-iron oxide and titanium oxide are preferred.

The nonmagnetic powder may be acicular, spherical, polyhedral, or plate-shaped. The crystallite size of the nonmagnetic powder preferably ranges from 4 nm to 500 nm, more preferably from 40 to 100 nm. The average particle diameter of the nonmagnetic powder preferably ranges from 5 nm to 500 nm, more preferably from 10 to 200 nm. The nonmagnetic powder with the above size is suitable for use in the nonmagnetic layer coating liquid for the magnetic recording medium for high-density recording. According to the present invention, nonmagnetic powders with the above size can be dispersed well in a nonmagnetic coating material.

From the perspective of achieving the effect by the combination of organic acids A and B, the specific surface area by BET method of the nonmagnetic powder preferably ranges from 1 to 150 $m^2/g$, more preferably from 20 to 120 $m^2/g$, and further preferably from 50 to 100 $m^2/g$. Oil absorption capacity using dibutyl phthalate (DBP) of the nonmagnetic powder preferably ranges from 5 to 100 mL/100 g, more preferably from 10 to 80 mL/100 g, and further preferably from 20 to 60 mL/100 g. The specific gravity preferably ranges from 1 to 12, more preferably from 3 to 6. The tap density preferably ranges from 0.05 to 2 g/mL, more preferably from 0.2 to 1.5 g/mL. A tap density falling within a range of 0.05 to 2 g/mL can reduce the amount of scattering particles, thereby facilitating handling, and tends to prevent solidification to the device. The pH of the nonmagnetic powder preferably ranges from 2 to 11, more preferably from 6 to 9. When the pH falls within a range of 2 to 11, the coefficient of friction does not become high at high temperature or high humidity, or due to the freeing of fatty acids. The moisture content of the nonmagnetic powder preferably ranges from 0.1 to 5 weight percent, more preferably from 0.2 to 3 weight percent, and further preferably from 0.3 to 1.5 weight percent. A moisture content falling within a range of 0.1 to 5 weight percent is desirable because it can produce good dispersion and yield a stable coating viscosity following dispersion. An ignition loss of equal to or less than 20 weight percent is desirable and nonmagnetic powders with low ignition losses are desirable.

When the nonmagnetic powder is an inorganic powder, the Mohs' hardness is preferably 4 to 10. Durability can be ensured if the Mohs' hardness ranges from 4 to 10. The heat of wetting in 25° C. water of the nonmagnetic powder is preferably within a range of 200 to 600 $mJ/cm^2$ (approximately 200 to 600 $erg/cm^2$). A solvent with a heat of wetting within this range may also be employed. The quantity of water molecules on the surface at 100 to 400° C. suitably ranges from 1 to 10 pieces per 100 Angstroms. The pH of the isoelectric point in water preferably ranges from 3 to 9. The surface of these nonmagnetic powders preferably contains $Al_2O_3$, $SiO_2$, $TiO_2$, $ZrO_2$, $SnO_2$, $Sb_2O_3$, and $ZnO$ by conducting surface treatment. The surface-treating agents of preference with regard to dispersibility are $Al_2O_3$, $SiO_2$, $TiO_2$, and $ZrO_2$, and $Al_2O_3$, $SiO_2$ and $ZrO_2$ are further preferable. They may be employed singly or in combination. Depending on the objective, a surface-treatment coating layer with a coprecipitated material may also be employed, the method which comprises a first alumina coating and a second silica coating thereover or the reverse method thereof may also be adopted. Depending on the objective, the surface-treatment coating layer may be a porous layer, with homogeneity and density being generally desirable.

Specific examples of nonmagnetic powders are: Nanotite from Showa Denko K. K.; HIT-100 and ZA-G1 from Sumitomo Chemical Co., Ltd.; DPN-250, DPN-250BX, DPN-245, DPN-270BX, DPN-550BX and DPN-550RX from Toda Kogyo Corp.; titanium oxide TTO-51B, TTO-55A, TTO-55B, TTO-55C, TTO-55S, TTO-55D, SN-100, MJ-7, α-iron oxide E270, E271 and E300 from Ishihara Sangyo Co., Ltd.; STT-4D, STT-30D, STT-30 and STT-65C from Titan Kogyo K. K.; MT-100S, MT-100T, MT-150W, MT-500B, T-600B, T-100F and T-500HD from Tayca Corporation; FINEX-25, BF-1, BF-10, BF-20 and ST-M from Sakai Chemical Industry Co., Ltd.; DEFIC-Y and DEFIC-R from Dowa Mining Co., Ltd.; AS2BM and TiO2P25 from Nippon Aerogil; 100A and 500A from Ube Industries, Ltd.; Y-LOP from Titan Kogyo K. K.; and sintered products of the same. Particular preferable nonmagnetic powders are titanium dioxide and α-iron oxide.

The details of the binder that is contained in the nonmagnetic layer are identical to those of the binder contained in the magnetic layer. Various additives and solvents that can be employed in magnetic recording media can be further incorporated into the nonmagnetic layer. The details of the various components, quantities added, and the like in the nonmagnetic layer are identical to those set forth above for the magnetic layer.

Nonmagnetic Support

Known films of the following may be employed as the nonmagnetic support in the present invention: polyethylene terephthalate, polyethylene naphthalate, other polyesters, polyolefins, cellulose triacetate, polycarbonate, polyamides, polyimides, polyamidoimides, polysulfones, aromatic polyamides, polybenzooxazoles, and the like. Supports having a glass transition temperature of equal to or higher than 100° C. are preferably employed. The use of polyethylene naphthalate, aramid, or some other high-strength support is particularly desirable. As needed, layered supports such as disclosed in Japanese Unexamined Patent Publication (KOKAI) Heisei No. 3-224127, which is expressly incorporated herein by reference in its entirety, may be employed to vary the surface roughness of the magnetic surface and support surface. These supports may be subjected beforehand to corona discharge treatment, plasma treatment, adhesion enhancing treatment, heat treatment, dust removal, and the like.

The center surface average surface roughness (Ra) of the nonmagnetic support as measured with an optical interfero-type surface roughness meter HD-2000 made by WYKO is preferably equal to or less than 8.0 nm, more preferably equal to or less than 4.0 nm, further preferably equal to or less than 2.0 nm. Not only does such a support desirably have a low center surface average surface roughness (Ra), but there are also desirably no large protrusions equal to or higher than 0.5 μm. The surface roughness shape may be freely controlled through the size and quantity of filler added to the support as needed. Examples of such fillers are oxides and carbonates of elements such as Ca, Si, and Ti, and organic powders such as acrylic-based one. The support desirably has a maximum height $R_{max}$ equal to or less than 1 μm, a ten-point average roughness $R_Z$ equal to or less than 0.5 μm, a center surface peak height $R_P$ equal to or less than 0.5 μm, a center surface valley depth $R_V$ equal to or less than 0.5 μm, a center-surface surface area percentage Sr of 10 percent to 90 percent, and an average wavelength $\lambda_a$ of 5 to 300 μm. To achieve desired electromagnetic characteristics and durability, the surface protrusion distribution of the support can be freely controlled with fillers. It is possible to control within a range from 0 to 2,000 protrusions of 0.01 to 1 μm in size per 0.1 mm².

The F-5 value of the nonmagnetic support suitable for use in the present invention desirably ranges from 5 to 50 kg/mm², approximately 49 to 490 MPa. The thermal shrinkage rate of the support after 30 min at 100° C. is preferably equal to or less than 3 percent, more preferably equal to or less than 1.5 percent. The thermal shrinkage rate after 30 min at 80° C. is preferably equal to or less than 1 percent, more preferably equal to or less than 0.5 percent. The breaking strength of the nonmagnetic support preferably ranges from 5 to 100 kg/mm², approximately 49 to 980 MPa. The modulus of elasticity preferably ranges from 100 to 2,000 kg/mm², approximately 0.98 to 19.6 GPa. The thermal expansion coefficient preferably ranges from $10^{-4}$ to $10^{-8}/°$ C., more preferably from $10^{-5}$ to $10^{-6}/°$ C. The moisture expansion coefficient is preferably equal to or less than $10^{-4}$/RH percent, more preferably equal to or less than $10^{-5}$/RH percent. These thermal characteristics, dimensional characteristics, and mechanical strength characteristics are desirably nearly equal, with a difference equal to less than 10 percent, in all in-plane directions in the support.

An undercoating layer can be provided in the magnetic recording medium of the present invention. Providing an undercoating layer can enhance adhesive strength between the support and the magnetic layer or nonmagnetic layer. For example, a polyester resin that is soluble in solvent can be employed as the undercoating layer to enhance adhesion. As described below, a smoothing layer can be provided as an undercoating layer.

Layer Structure

In the magnetic recording medium according to the present invention, the thickness of the nonmagnetic support preferably ranges from 3 to 80 μm, more preferably 3 to 50 μm, and further preferably, 3 to 10 μm. When an undercoating layer is provided between the nonmagnetic support and the nonmagnetic layer or the magnetic layer, the thickness of the undercoating layer is, for example, from 0.01 to 0.8 μm, preferably from 0.02 to 0.6 μm.

An intermediate layer can be provided between the support and the nonmagnetic layer or the magnetic layer and/or between the support and the backcoat layer to improve smoothness. For example, the intermediate layer can be formed by coating and drying a coating liquid comprising a polymer on the surface of the nonmagnetic support, or by coating a coating liquid comprising a compound (radiation-curable compound) comprising intramolecular radiation-curable functional groups and then irradiating it with radiation to cure the coating liquid.

The thickness of the magnetic layer can be optimized based on the saturation magnetization of the head employed, the length of the head gap, and the recording signal band, and is normally 10 to 150 nm, preferably 20 to 120 nm, more preferably 30 to 100 nm, and further preferably 30 to 80 nm. The thickness variation (σ/δ) in the magnetic layer is preferably within ±50 percent, more preferably within ±30 percent. At least one magnetic layer is sufficient. The magnetic layer may be divided into two or more layers having different magnetic characteristics, and a known configuration relating to multi-layered magnetic layer may be applied.

The thickness of the nonmagnetic layer ranges from, for example, 0.1 to 3.0 µm, preferably 0.2 to 2.0 µm, and more preferably 0.3 to 1.5 µm. The nonmagnetic layer is effective so long as it is substantially nonmagnetic in the magnetic recording medium of the present invention. For example, it exhibits the effect of the present invention even when it comprises impurities or trace amounts of magnetic material that have been intentionally incorporated, and can be viewed as substantially having the same configuration as the magnetic recording medium of the present invention. The term "substantially nonmagnetic" is used to mean having a residual magnetic flux density in the nonmagnetic layer of equal to or less than 10 mT, or a coercivity of equal to or less than 7.96 kA/m (100 Oe), it being preferable not to have a residual magnetic flux density or coercivity at all.

Backcoat Layer

The magnetic recording medium of the present invention can have a backcoat layer on the opposite surface of the nonmagnetic support from the surface on which the magnetic layer is present. The backcoat layer desirably comprises carbon black and inorganic powder. The compositions of the magnetic layer and nonmagnetic layer can be applied to the binder and various additives of the backcoat layer. In particular, the composition of the nonmagnetic layer can be applied. The thickness of the backcoat layer is desirably equal to or less than 0.9 µm, preferably 0.1 to 0.7 µm.

Manufacturing Method

In the process of manufacturing the magnetic recording medium, for example, the nonmagnetic layer can be formed by coating a nonmagnetic layer coating liquid to a prescribed film thickness on the surface of a nonmagnetic support while the nonmagnetic support is running, and then the magnetic layer can be formed by coating a magnetic layer coating liquid to a prescribed film thickness thereover. Multiple magnetic layer coating liquids can be successively or simultaneously coated in a multilayer coating, and the nonmagnetic layer coating liquid and the magnetic layer coating liquid can be successively or simultaneously applied in a multilayer coating. Coating machines suitable for use in coating the magnetic layer and nonmagnetic layer coating liquids are air doctor coaters, blade coaters, rod coaters, extrusion coaters, air knife coaters, squeeze coaters, immersion coaters, reverse roll coaters, transfer roll coaters, gravure coaters, kiss coaters, cast coaters, spray coaters, spin coaters, and the like. For example, "Recent Coating Techniques" (May 31, 1983), issued by the Sogo Gijutsu Center K.K., which is expressly incorporated herein by reference in its entirety, may be referred to in this regard.

For a magnetic tape, the coating layer that is formed by applying the magnetic layer coating liquid can be magnetic field orientation processed using cobalt magnets or solenoids on the ferromagnetic powder contained in the coating layer. In the case of a disk, adequately isotropic orientation can sometimes be achieved with no orientation without using an orienting device. However, the diagonal arrangement of cobalt magnets in alternating fashion or the use of a known random orienting device such as a solenoid to apply an a.c. magnetic field is desirable. In the case of a ferromagnetic metal powder, the term "isotropic orientation" generally means randomness in the two in-plane dimensions, but can also be three-dimensional randomness when the vertical component is included. A known method such as magnets with opposite poles positioned opposite each other can also be employed to impart isotropic magnetic characteristics in a circumferential direction by effecting vertical orientation. When conducting particularly high-density recording, vertical orientation is desirable. Spin coating can also be employed to effect circumferential orientation.

The drying position of the coating is desirably controlled by controlling the temperature and flow rate of drying air, and coating speed. A coating speed of 20 m/min to 1,000 m/min and a dry air temperature of equal to or higher than 60° C. are desirable. Suitable predrying can be conducted prior to entry into the magnet zone.

The coated stock material obtained in this manner is normally temporarily rolled on a pickup roll, and after a period, wound off the pickup roll and subjected to calendering.

In calendering, super calender rolls or the like can be employed. Calendering can enhance the smoothness of the surface, eliminate voids produced by removing the solvent during drying, and increase the fill rate of ferromagnetic powder in the magnetic layer, yielding a magnetic recording medium with good electromagnetic characteristics. The calendering step is desirably conducted by varying the calendering conditions based on the smoothness of the surface of the coated stock material.

Calender rolls made of epoxy, polyimide, polyamide, polyamideimide, and other heat-resistant plastic rolls can be employed. Processing can also be conducted with metal rolls. Among the calendering conditions, the calender roll temperature, for example, falls within a range of 60 to 100° C., desirably a range of 70 to 100° C., and preferably a range of 80 to 100° C. The pressure, for example, falls within a range of 100 to 500 kg/cm (approximately 98 to 490 kN/m), preferably a range of 200 to 450 kg/cm (approximately 196 to 441 kN/m), and preferably a range of 300 to 400 kg/cm (approximately 294 to 392 kN/m). To increase the smoothness of the magnetic layer surface, the nonmagnetic layer surface can also be calendered. Calendering of the nonmagnetic layer is also desirably conducted under the above conditions.

The magnetic recording medium that is obtained can be cut to desired size with a cutter or the like for use. The cutter is not specifically limited, but desirably comprises multiple sets of a rotating upper blade (male blade) and lower blade (female blade). The slitting speed, engaging depth, peripheral speed ratio of the upper blade (male blade) and lower blade (female blade) (upper blade peripheral speed/lower blade peripheral speed), period of continuous use of slitting blade, and the like can be suitably selected.

Physical Characteristics

The surface roughness of the magnetic layer desirably falls within a range of 1.0 to 3.5 nm as a centerline average roughness Ra measured for an area of 40 µm×40 µm on the surface of the magnetic layer by an atomic force microscope (AFM). With a centerline average roughness of the magnetic layer of equal to or less than 3.5 nm, it is possible to achieve better electromagnetic characteristics, and at equal to or higher than 1.0 nm, running stability can increase. The centerline average roughness of the magnetic layer is desirably 1.5 to 3.0 nm, preferably 1.5 to 2.5 nm. In the present invention, the use of organic acid A permits the formation of a magnetic layer of good surface smoothness. The surface smoothness of the magnetic layer can be controlled by means of the particle size of the ferromagnetic powder, the dispersion conditions of the magnetic layer coating liquid, the calendering conditions, the adjustment of the quantity of filler in the nonmagnetic support, the use of an undercoating layer for smoothness, and the like.

The coercivity (Hc) of the magnetic layer is preferably 143.2 to 318.3 kA/m (approximately 1,800 to 4,000 Oe), more preferably 159.2 to 278.5 kA/m (approximately 2,000 to 3,500 Oe). Narrower coercivity distribution is preferable.

The SFD and SFDr are preferably equal to or lower than 0.8, more preferably equal to or lower than 0.5.

The coefficient of friction of the magnetic recording medium of the present invention relative to the head is, for example, equal to or less than 0.50 and preferably equal to or less than 0.3 at temperatures ranging from −10° C. to 40° C. and humidity ranging from 0 percent to 95 percent, the surface resistivity on the magnetic surface preferably ranges from $10^4$ to $10^8$ ohm/sq, and the charge potential preferably ranges from −500 V to +500 V. The modulus of elasticity at 0.5 percent extension of the magnetic layer preferably ranges from 0.98 to 19.6 GPa (approximately 100 to 2,000 kg/mm$^2$) in each in-plane direction. The breaking strength preferably ranges from 98 to 686 MPa (approximately 10 to 70 kg/mm$^2$). The modulus of elasticity of the magnetic recording medium preferably ranges from 0.98 to 14.7 GPa (approximately 100 to 1500 kg/mm$^2$) in each in-plane direction. The residual elongation is preferably equal to or less than 0.5 percent, and the thermal shrinkage rate at all temperatures below 100° C. is preferably equal to or less than 1 percent, more preferably equal to or less than 0.5 percent, and most preferably equal to or less than 0.1 percent.

The glass transition temperature (i.e., the temperature at which the loss elastic modulus of dynamic viscoelasticity peaks as measured at 110 Hz with a dynamic viscoelastometer, such as RHEOVIBRON) of the magnetic layer preferably ranges from 50 to 180° C., and that of the nonmagnetic layer preferably ranges from 0 to 180° C. The loss elastic modulus preferably falls within a range of $1\times10^7$ to $8\times10^8$ Pa (approximately $1\times10^8$ to $8\times10^9$ dyne/cm$^2$) and the loss tangent is preferably equal to or less than 0.2. Adhesion failure tends to occur when the loss tangent becomes excessively large. These thermal characteristics and mechanical characteristics are desirably nearly identical, varying by equal to or less than 10 percent, in each in-plane direction of the medium.

The residual solvent contained in the magnetic layer is preferably equal to or less than 100 mg/m$^2$ and more preferably equal to or less than 10 mg/m$^2$. The void ratio in the coated layers, including both the nonmagnetic layer and the magnetic layer, is preferably equal to or less than 40 volume percent, more preferably equal to or less than 30 volume percent. Although a low void ratio is preferable for attaining high output, there are some cases in which it is better to ensure a certain level based on the object. For example, in many cases, larger void ratio permits preferred running durability in disk media in which repeat use is important.

Physical properties of the nonmagnetic layer and magnetic layer may be varied based on the objective in the magnetic recording medium of the present invention. For example, the modulus of elasticity of the magnetic layer may be increased to improve running durability while simultaneously employing a lower modulus of elasticity than

EXAMPLES

The present invention will be described in detail below based on Examples. However, the present invention is not limited to the examples. The terms "parts" and "percent" given in Examples are weight parts and weight percent unless specifically stated otherwise.

Example 1

(1) Preparation of Magnetic Layer Coating Liquid

Ferromagnetic metal powder: 100 parts
Composition Fe/Co=100/25
Hc: 195kA/m (approximately 2450 Oe)
Specific surface area by BET method: 65 m$^2$/g
Surface treatment agent: $Al_2O_3$, $SiO_2$, $Y_2O_3$
Particle size (major axis diameter): 45 nm
Acicular ratio: 5
σs: 110A·m$^2$/kg (approximately 110 emu/g)
Organic acid A (phenylphosphonic acid): 1.5 parts
Vinyl chloride copolymer MR104 (made by Zeon Corporation): 10 parts
Polyurethane resin: PU-(1): 10 parts
Methyl ethyl ketone: 150 parts
Cyclohexanone: 150 parts
α-$Al_2O_3$ (Mohs' hardness:9, average particle diameter: 0.1 μm): 15 parts
Carbon black (average particle diameter: 0.08 μm): 0.5 part The various components of the above coating material were kneaded in an open kneader and then dispersed using a sand mill. The components listed below were added to the dispersion obtained. The mixture was then stirred, processed with ultrasound, and passed through a filter with an average pore diameter of 1 μm to prepare a magnetic layer coating liquid.

Organic acid B (citric acid): 1.5 parts
Butyl stearate: 1.5 parts
Stearic acid: 0.5 part
Methyl ethyl ketone: 50 parts
Cyclohexanone: 50 parts
Toluene: 3 parts
Polyisocyanate compound (Coronate 3041 made by Nippon Polyurethane Industry Co. Ltd.): 5 parts (2) Preparation of Nonmagnetic Layer Coating Liquid Nonmagnetic powder (α$Fe_2O_3$ hematite): 80 parts
Major acicular length: 0.15 μm
Specific surface area by BET method: 52 m$^2$/g
pH: 6
Tap density: 0.8
DBP oil absorption capacity: 27 to 38 g/100 g,
Surface treatment agent: $Al_2O_3$, $SiO_2$
Carbon black: 20 parts
Average primary particle diameter 0.020 μm
DBP oil absorption capacity 80 ml/100 g
pH 8.0
Specific surface area by BET method: 250 m$^2$/g
Volatile content: 1.5%
Vinyl chloride copolymer MR104 (made by Zeon Corporation): 12 parts
Polyurethane resin: PU-(1): 7.5 parts
Methyl ethyl ketone: 150 parts
Cyclohexanone: 150 parts The various components of the above coating material were kneaded in an open kneader and then dispersed using a sand mill. The components listed below were added to the dispersion obtained. The mixture was then stirred and passed through a filter with an average pore diameter of 1 μm to prepare a lower coating layer (nonmagnetic layer) coating liquid.

Butyl stearate: 1.5 parts
Stearic acid: 1 part
Methyl ethyl ketone: 50 parts
Cyclohexanone: 50 parts
Toluene: 3 parts Polyisocyanate compound (Coronate 3041 made by Nippon Polyurethane Industry Co. Ltd.): 5 parts (3) Preparation of Backcoat Layer Coating Liquid Carbon black (average particle diameter: 40 nm): 85 parts
Carbon black (average particle diameter: 100 nm): 3 parts
Nitrocellulose: 28 parts
Polyurethane resin: 58 parts
Copper phthalocyanine-based dispersing agent: 2.5 parts
Nippollan 2301 (Nippon Polyurethane Industry Co. Ltd.): 0.5 parts
Methyl isobutyl ketone: 0.3 part
Methyl ethyl ketone: 860 parts
Toluene: 240 parts Following pre-kneading of the above components in a roll mill, they were dispersed in a sand mill; 4 parts of polyester resin (Vylon 500 from Toyobo Co., Ltd.), 14 parts of polyisocyanate compound (Coronate 3041 made by Nippon Polyurethane Industry Co., Ltd.), and 5 parts of $\alpha$-$Al_2O_3$ (made by Sumitomo Chemical Co., Ltd.) were added; and the mixture was stirred and filtered to prepare a backcoat layer coating liquid.

Simultaneous multilayer coating of the above nonmagnetic layer coating liquid in a quantity calculated to yield a dry thickness of 1.0 μm, and immediately thereafter, of the above magnetic layer coating liquid in a quantity calculated to yield a magnetic layer thickness of 0.1 μm, was conducted on a polyethylene naphthalate resin support that was 5 μm in thickness, that had a base surface that had been subjected to a preliminary corona treatment to render it hydrophilic, and that had a surface over which the magnetic layer was formed with a centerline average roughness of 0.001 μm. While the two layers were still wet, they were oriented with cobalt magnets having a magnetic force of 0.5 T (5,000 G) and solenoids having a magnetic force of 0.4 T (4,000 G) and then dried. Subsequently, the above backcoat layer coating liquid was applied to the base surface that had been subjected to a preliminary corona treatment in a quantity calculated to yield a dry thickness of 0.5 μm. Processing with a seven-stage calender comprised of metal rolls was then conducted at a temperature of 100° C. at a rate of 80 m/minute, and the product was slit to a width of ½ mm to prepare a magnetic recording tape.

Examples 2 to 10, Comparative Examples 1 to 10

With the exception that the organic acids A and B that were introduced into the magnetic layer were changed as indicated in Table 1, magnetic recording tapes were prepared by the same method as in Example 1.

Examples 11 to 16

With the exception that the polyurethane resin employed in the magnetic layer was changed as indicated in Table 2, magnetic recording tapes were prepared by the same method as in Example 1. In Table 2, component A corresponds to a polyester polyol (A) with structural components in the form of a dibasic acid and a glycol component; in component B, MDI denotes an aromatic isocyanate (B); and component C corresponds to a compound (C) with a molecular weight of less than 1,000 having two or more functional groups capable of reacting with an isocyanate group per molecule and having a branching side chain. The glass transition temperatures indicated in Table 2 were measured by the following method. The weight average molecular weight was calculated by standard polystyrene conversion using DMF solvent comprising 0.3 weight percent of lithium boride.

[Method of Calculating the Glass Transition Temperature]

Polymer solutions of various polyurethane resins were coated to a thickness of 30 μm on an aramid base (made by Asahi Kasei Corporation) and dried at 140° C. under vacuum for three hours. The films were punched to a size of 3.35 mm×60.0 mm to prepare glass transition temperature measurement samples. The dynamic viscoelastic characteristics of the samples thus prepared were measured with a Vibron dynamic viscoelasticity device, Model RHEO-2000 (TOYO BACDWIN), and the point of inflection in temperature of the loss elastic modulus (E") was adopted as the glass transition temperature.

The abbreviations in Table 2 have the following meanings:
NPG: Neopentyl glycol
PG: Propylene glycol
MDI: 4,4'-Diphenylmethane diisocyanate
HDM: 2-Butyl-2-ethyl-1,3-propanediol
TCDM: Tricyclodecanedimethanol Example 17

With the exception that the nonmagnetic layer coating liquid listed below was employed, a magnetic recording tape was prepared by the same method as in Example 1.
Nonmagnetic powder ($\alpha Fe_2O_3$ hematite): 80 parts
Major acicular length: 0.15 μm
Specific surface area by BET method: 52 m$^2$/g
pH: 6
Tap density: 0.8
DBP oil absorption capacity: 27 to 38 g/100 g,
Surface treatment agent: $Al_2O_3$, $SiO_2$
Carbon black: 20 parts
Average primary particle diameter 0.020 μm
DBP oil absorption capacity 80 ml/100 g
pH 8.0
Specific surface area by BET method: 250 m$^2$/g
Volatile content: 1.5%
Organic acid A (phenylphosphonic acid): 1.5 parts
Vinyl chloride copolymer MR104 (made by Zeon Corporation): 12 parts
Polyurethane resin: PU-(1): 7.5 parts
Methyl ethyl ketone: 150 parts
Cyclohexanone: 150 parts The various components of the above coating material were kneaded in an open kneader and then dispersed using a sand mill. The components listed below were added to the dispersion obtained. The mixture was then stirred and passed through a filter with an average pore diameter of 1 μm to prepare a coating liquid for a lower coating layer (nonmagnetic layer).
Organic acid B (citric acid): 1.5 parts
Butyl stearate: 1.5 parts
Stearic acid: 1 part
Methyl ethyl ketone: 50 parts
Cyclohexanone: 50 parts
Toluene: 3 parts
Polyisocyanate compound (Coronate 3041 made by Nippon Polyurethane Industry Co. Ltd.): 5 parts Example 18

With the exception that the magnetic layer coating liquid (containing organic acid A, not containing organic acid B)

employed in Comparative Example 9 was employed, a magnetic recording tape was prepared by the same method as in Example 17.

Example 19

With the exception that the magnetic layer coating liquid (to which organic acids A and B were simultaneously added) was prepared by the following method, a magnetic recording tape was prepared by the same method as in Example 1.

The same ferromagnetic metal powder as employed in Example 1: 100 parts
Organic acid A (phenylphosphonic acid): 1.5 parts
Organic acid B (citric acid): 1.5 parts
Vinyl chloride copolymer MR104 (made by Zeon Corporation): 10 parts
Polyurethane resin: PU-(1): 10 parts
Methyl ethyl ketone: 150 parts
Cyclohexanone: 150 parts
α-$Al_2O_3$ (Mohs' hardness: 9, average particle diameter: 0.1 μm): 15 parts
Carbon black (average particle diameter: 0.08 μm): 0.5 part The various components of the above coating material were kneaded in an open kneader and then dispersed using a sand mill. The components listed below were added to the dispersion obtained. The mixture was then stirred, processed with ultrasound, and passed through a filter with an average pore diameter of 1 μm to prepare a magnetic layer coating liquid.

Butyl stearate: 1.5 parts
Stearic acid: 0.5 part
Methyl ethyl ketone: 50 parts
Cyclohexanone: 50 parts
Toluene: 3 parts
Polyisocyanate compound (Coronate 3041 made by Nippon Polyurethane Industry Co. Ltd.): 5 parts The structures of the organic acids employed in Examples and Comparative examples are given below:

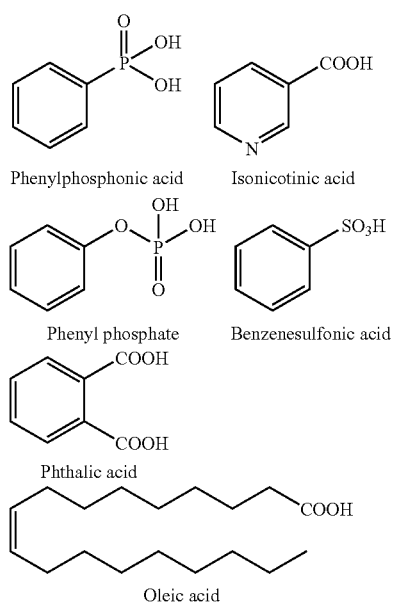

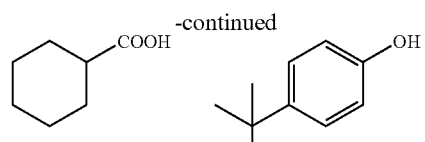

Cyclohexanecarboxylic acid   4-tert-butylphenol

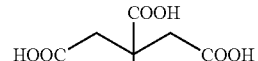

Citric acid

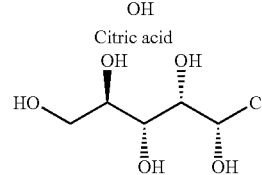

Gluconic acid   Malic acid

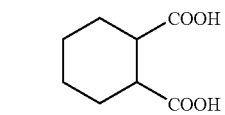

1,2-Cyclohexanedicarboxylic acid

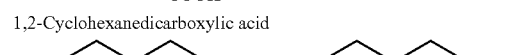

1,2,3-propanetricarboxylic acid   1,3-propanedicarboxylic acid

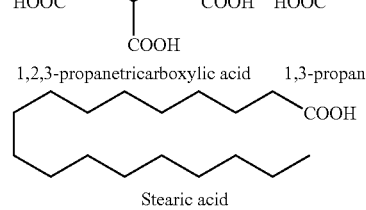

Stearic acid (Evaluation Methods)
<Acid Strength of Organic Acids A and B>

A 50 mg sample of organic acid A or B was dissolved in a mixed solution of 20 mL of water and 30 mL of tetrahydrofuran. Titration to neutral was conducted with 0.1N NaOH (Wako Pure Chemical Industries) using a model GT-100 Win automatic titrator made by Mitsubishi Chemical Analytech. The pH corresponding to half of the titration quantity that was added dropwise to attain the neutralization point was read, and that pH was adopted as the acid strength.

<Centerline Average Surface Roughness of the Tape>

An atomic force microscope (AFM: Nanoscope III made by Digital Instruments) was employed in contact mode to measure a 40 μm×40 μm area of the surface of the magnetic layer and measure the centerline average surface roughness (Ra).

<Electromagnetic Characteristics: S/N Ratio>

Signals were recorded at linear recording densities of 172 kfci and 86 kfci using an LTO-Gen 4 drive, a recording track of 11.5 μm, and a reproduction track width of 5.3 μm. The reproduced signals were frequency analyzed with a spectrum analyzer. The ratio of the carrier signal output during 172 kfci signal recording to the integral noise over the entire spectral band during 86 kfci signal recording was adopted as the S/N ratio. An LTO-Gen 4 tape made by FUIJIFILM was employed as reference at 0 dB. Electromagnetic characteristics of 0 dB and above were considered good.

<Amount of Grime on Tape Surface>

A tape was run over the edge of a square bar having a cross-section of 7 mm×7 mm made of $Al_2O_3$/TiC so that the magnetic layer surface came into contact at an angle of 150 degrees. A 100 m length was slid in one pass with a load of 100 g at a speed of 6 m/s. The edge of the square bar was observed under a microscope, and the adhesion of grime was evaluated. A sensory evaluation was conducted on a scale of 10. A rating of 10 indicated little grime, and a rating of 1 indicated the most grime. A grime rating of 8 or above was considered good.

<Error Rate Before and after Repeat Running>

An LTO-Gen 4 drive was employed in the same manner as for the S/N ratio. Data signals with recording tracks of 11.5 µm and reproduction track widths of 5.3 µm were recorded on and reproduced from a tape length of 300 m and the error rate (ER1) was measured. Subsequently, 15,000 passes (7,500 runs back and forth) of a tape length of 300 m were made by sliding the tape at a running speed of 6 m/s against a head. The error rate (ER2) was measured under the same conditions as ER1 following running. The ratio of ER2/ER1 was calculated. A level of equal to or lower than 10 (that is, the error rate following repeated running was equal to or less than 10-fold what it was before running) was considered to indicate good repeat running durability.

The above results are given in Tables 1 to 5.

TABLE 1

Table 1: Examples and Comparative Examples employing the same polyurethane

Organic acid A and B added to the magnetic layer

| | | | Organic acid A | | | | Organic acid B | | | |
|---|---|---|---|---|---|---|---|---|---|---|
| | | | | Substituent | | | | Substituent | | |
| | | Name | Type | Number per molecule | Skeleton Unsaturated bond | pKa(A) | Name | Number of carboxyl group | Number of hydroxyl group | Total number of substituents |
| Example | 1 | Phenylphosphonic acid | Phosphonic acid group | 1 | Present | 3.93 | Citric acid | 3 | 1 | 4 |
| | 2 | Phenylphosphonic acid | Phosphonic acid group | 1 | Present | 3.93 | Gluconic acid | 1 | 5 | 6 |
| | 3 | Phenylphosphonic acid | Phosphonic acid group | 1 | Present | 3.93 | Malic acid | 2 | 1 | 3 |
| | 4 | Phenylphosphonic acid | Phosphonic acid group | 1 | Present | 3.93 | 1,2-Cyclohexanedicarboxylic acid | 2 | 0 | 2 |
| | 5 | Phenylphosphonic acid | Phosphonic acid group | 1 | Present | 3.93 | 1,2,3-propanetricarboxylic acid | 3 | 0 | 3 |
| | 6 | Isonicotinic acid | Carboxyl group | 1 | Present | 5.01 | Citric acid | 3 | 1 | 4 |
| | 7 | Isonicotinic acid | Carboxyl group | 1 | Present | 5.01 | Gluconic aci | 1 | 5 | 6 |
| | 8 | Isonicotinic acid | Carboxyl group | 1 | Present | 5.01 | Malic acid | 2 | 1 | 3 |
| | 9 | Isonicotinic acid | Carboxyl group | 1 | Present | 5.01 | 1,2,3-propanetricarboxylic acid | 3 | 0 | 3 |
| | 10 | Phenyl phosphate | Phosphoric acid group | 1 | Present | 4.01 | 1,2,3-propanetricarboxylic acid | 3 | 0 | 3 |
| Comp. Ex. | 1 | Benzenesulfonic acid | Sulfonic acid group | 1 | Present | 2.42 | 1,2,3-propanetricarboxylic acid | 3 | 0 | 3 |
| | 2 | Phthalic acid | Carboxyl group | 2 | Present | 4.27 | 1,2,3-propanetricarboxylic acid | 3 | 0 | 3 |
| | 3 | Oleic acid | Carboxyl group | 1 | Present | 7.41 | 1,2,3-propanetricarboxylic acid | 3 | 0 | 3 |
| | 4 | Cyclohexane-carboxylic acid | Carboxyl group | 1 | None | 7.58 | 1,2,3-propanetricarboxylic acid | 3 | 0 | 3 |
| | 5 | Phenylphosphonic acid | Phosphonic acid group | 1 | Present | 3.93 | 1,3-propanedicarboxylic acid | 2 | 0 | 2 |
| | 6 | Phenylphosphonic acid | Phosphonic acid group | 1 | Present | 3.93 | Stearic acid | 1 | 0 | 1 |
| | 7 | Phenylphosphonic acid | Phosphonic acid group | 1 | Present | 3.93 | Phthalic acid | 2 | 0 | 2 |
| | 8 | 4-tert-butylphenol | Hydroxyl group | 1 | Present | 11.4 | 1,2,3-propanetricarboxylic acid | 3 | 0 | 3 |
| | 9 | Phenylphosphonic acid | Phosphonic acid group | 1 | Present | 3.93 | None | — | — | — |
| | 10 | None | — | — | — | — | Citric acid | 3 | 1 | 4 |

TABLE 1-continued

Table 1: Examples and Comparative Examples employing the same polyurethane

| | | Organic acid A and B added to the magnetic layer | | | | | Dispersibility | | Repeat running durability | |
|---|---|---|---|---|---|---|---|---|---|---|
| | | | Organic acid B | | | | | | | |
| | | Skeleton Strucure | Position to which substituent is substituted | pKa(B) | Magnitude relation of pKa(A) and pKa(B) | No. of polyurethane resin employed in the magnetic layer | Surface property Ra(nm) | S/N (dB) | Amount of grime (Poor)1-10(good) | Error rate ER2/ER1 |
| Example | 1 | Aliphatic | Adjacent carbons | 5.84 | (A) < (B) | PU-(1) | 2.8 | 1.0 | 9 | 3.0 |
| | 2 | Aliphatic | Adjacent carbons | 5.28 | (A) < (B) | PU-(1) | 2.7 | 1.5 | 9 | 2.8 |
| | 3 | Aliphatic | Adjacent carbons | 5.64 | (A) < (B) | PU-(1) | 2.8 | 1.0 | 8 | 6.0 |
| | 4 | Alicyclic | Adjacent carbons | 6.10 | (A) < (B) | PU-(1) | 2.9 | 0.0 | 8 | 5.0 |
| | 5 | Aliphatic | Adjacent carbons | 6.43 | (A) < (B) | PU-(1) | 2.9 | 0.0 | 10 | 1.5 |
| | 6 | Aliphatic | Adjacent carbons | 5.84 | (A) < (B) | PU-(1) | 2.6 | 2.0 | 9 | 3.0 |
| | 7 | Aliphatic | Adjacent carbon | 5.28 | (A) < (B) | PU-(1) | 2.5 | 2.5 | 9 | 2.7 |
| | 8 | Aliphatic | Adjacent carbon | 5.64 | (A) < (B) | PU-(1) | 2.6 | 2.0 | 8 | 6.3 |
| | 9 | Aliphatic | Adjacent carbons | 6.43 | (A) < (B) | PU-(1) | 2.7 | 1.5 | 10 | 1.3 |
| | 10 | Aliphatic | Adjacent carbons | 6.43 | (A) < (B) | PU-(1) | 2.9 | 0.0 | 9 | 3.0 |
| Comp. Ex. | 1 | Aliphatic | Adjacent carbons | 6.43 | (A) < (B) | PU-(1) | 5.0 | −3.0 | 8 | 5.0 |
| | 2 | Aliphatic | Adjacent carbons | 6.43 | (A) < (B) | PU-(1) | 4.5 | −2.5 | 8 | 5.0 |
| | 3 | Aliphatic | Adjacent carbons | 6.43 | (A) > (B) | PU-(1) | 4.0 | −2.0 | 8 | 5.0 |
| | 4 | Aliphatic | Adjacent carbons | 6.43 | (A) > (B) | PU-(1) | 6.0 | −5.0 | 8 | 5.0 |
| | 5 | Aliphatic | Not adjacent | 6.12 | (A) < (B) | PU-(1) | 2.8 | 1.0 | 5 | 20 |
| | 6 | Aliphatic | Not adjacent | 7.39 | (A) < (B) | PU-(1) | 2.7 | 1.5 | 2 | 1000 |
| | 7 | Aromatic | Adjacent carbons | 4.27 | (A) < (B) | PU-(1) | 2.8 | 1.0 | 3 | 100 |
| | 8 | Aliphatic | Adjacent carbons | 6.43 | (A) > (B) | PU-(1) | 2.9 | 0.0 | 4 | 30 |
| | 9 | — | — | — | — | PU-(1) | 2.8 | 1.0 | 2 | 700 |
| | 10 | Aliphatic | Adjacent carbons | 5.84 | — | PU-(1) | 7.0 | Evaluation was not possible. | 1 | Evaluation was not possible. |

TABLE 2

Table 2: Examples employing different polyurethane

| | Polyurethane resin | Component A | | | |
|---|---|---|---|---|---|
| Example No. | | Dibasic acid | Glycol | Component B | Compoment C |
| 1 | PU-(1) | Adipic acid | NPG | MDI | HDM |
| 11 | PU-(2) | Adipic acid | NPG | MDI | HDM |
| 12 | PU-(3) | Phthalic acid | PG | MDI | HDM |
| 13 | PU-(4) | Phthalic acid | PG | MDI | TCDM |
| 14 | PU-(5) | Phthalic acid | PG | MDI | HDM |
| 15 | PU-(6) | Phthalic acid | PG | MDI | HDM |
| 16 | PU-(7) | Adipic acid | NPG | Hexamethylene diisocyanate | HDM |

TABLE 2-continued

Table 2: Examples employing different polyurethane

| Example | Weight average molecular weight | Glass transition temp. | Content of polar group (—SO$_3$Na) | Urethane group concentration |
|---|---|---|---|---|
| 1 | 70,000 | 79° C. | 0.7 × 10$^{-4}$ mole/g | 3.7 mmol/g |
| 11 | 130,000 | 78° C. | 0.7 × 10$^{-4}$ mole/g | 3.7 mmol/g |
| 12 | 70,000 | 110° C. | 0.7 × 10$^{-4}$ mole/g | 1.2 mmol/g |
| 13 | 70,000 | 126° C. | 0.7 × 10$^{-4}$ mole/g | 2.0 mmol/g |
| 14 | 70,000 | 108° C. | 1.5 × 10$^{-4}$ mole/g | 1.2 mmol/g |
| 15 | 70,000 | 105° C. | 2.0 × 10$^{-4}$ mole/g | 1.2 mmol/g |
| 16 | 70,000 | 55° C. | 0.7 × 10$^{-4}$ mole/g | 3.7 mmol/g |

| Example | Surface property Ra(nm) | S/N (dB) | Amount of grime (Poor)1-10(good) | Error rate ER2/ER1 |
|---|---|---|---|---|
| 1 | 2.8 | 1.0 | 9 | 3.0 |
| 11 | 2.9 | 0.5 | 9 | 2.0 |
| 12 | 2.6 | 2.0 | 10 | 1.5 |
| 13 | 2.6 | 2.0 | 10 | 1.2 |
| 14 | 2.4 | 3.0 | 10 | 1.4 |
| 15 | 2.3 | 3.5 | 10 | 1.5 |
| 16 | 2.7 | 1.5 | 8 | 7.0 |

TABLE 3

Table 3: Examples containing or not containing organic acids A and B in the nonmagnetic layer (in both Examples, organic acids A and B were contained in the magnetic layer)

Organic acids A and B added to the nonmagnetic layer

| | Organic acid A | | | | Organic acid B | | | |
|---|---|---|---|---|---|---|---|---|
| | | Substituent | | Skeleton | | | Substituent | |
| Example | Name | Substituent Type | Number per molecule | Unsaturated bond | pKa(A) | Name | Number of carboxyl group | Number of hydroxyl group | Total number of substituents |
| 1 | None | — | — | — | — | None | — | — | — |
| 17 | Phenylphosphonic acid | Phosphonic acid group | 1 | Present | 3.93 | Citric acid | 3 | 1 | 4 |

Organic acid A and B added to the magnetic layer

| | | Organic acid B | | | Dispersibility | | Repeat running durability | |
|---|---|---|---|---|---|---|---|---|
| Example | Skeleton Structure | Position to which substituent is substituted | pKa(B) | Magnitude relation of pKa(A) and pKa(B) | Surface property Ra(nm) | S/N (dB) | Amount of grime (Poor)1-10(good) | Error rate ER2/ER1 |
| 1 | — | — | — | — | 2.8 | 1.0 | 9 | 3 |
| 17 | Aliphatic | Adjacent carbons | 5.84 | (A) < (B) | 2.4 | 4.0 | 10 | 1.1 |

TABLE 4

Table 4: Example containing organic acids A and B in the nonmagnetic layer and Com. Ex. not comprising the same in the nonmagnetic layer Organic acid A and B added to the magnetic layer

| | Organic acid A | | | | | Organic acid B | Organic acid A | | | | |
|---|---|---|---|---|---|---|---|---|---|---|---|
| | | Substituent | | | | | | Substituent | | | |
| Example | Name | Type | Number per molecule | Skeleton Unsaturated bond | pKa (A) | Name | Name | Type | Number per molecule | Skeleton Unsaturated bond | pKa (A) |
| 18 | Phenyl-phosphonic acid | Phosphonic acid group | 1 | Present | 3.93 | None | Phenyl-phosphonic acid | Phosphonic acid group | 1 | Present | 3.93 |

TABLE 4-continued

Table 4: Example containing organic acids A and B in the nonmagnetic layer and Com. Ex. not comprising the same in the nonmagnetic layer

| | | | | | | | | | | | | |
|---|---|---|---|---|---|---|---|---|---|---|---|---|
| Comp. Ex. | 9 | Phenyl-phosphonic acid | Phosphonic acid group | 1 | Present | 3.93 | None | None | — | — | — | — |

| | | Organic acid A and B added to the nonmagnetic layer | | | | | | | | |
|---|---|---|---|---|---|---|---|---|---|---|
| | | Organic acid B | | | | | | | Repeat running durability | |
| | | Substituent | | | | Position to which substituent is substituted | | Magnitude relation of pKa(A) and pKa(B) | Dispersibility | Amount of grime (Poor)1-10(good) | Error rate ER2/E |
| | Name | Number of carboxyl group | Number of hydroxyl group | Total number of substituents | Skeleton Strucure | | pKa (B) | | Surface property Ra(nm) | S/N (dB) | | |
| Example | 18 Citric acid | 3 | 1 | 4 | Aliphatic | Adjacent carbons | 5.84 | (A) < (B) | 2.4 | 4.0 | 8 | 7.0 |
| Comp. Ex. | 9 None | — | — | — | — | — | — | — | 2.8 | 1.0 | 2 | 700 |

TABLE 5

Table 5: Examples mixing organic acids A and B separately or simultaneously

| | | Dispersibility | | Repeat running durability | |
|---|---|---|---|---|---|
| Example | Mixing method of organic acids A and B | Surface property Ra(nm) | S/N (dB) | Amount of grime (Poor)1-10(good) | Error rate ER2/ER1 |
| 1 | Separately mixed | 2.8 | 1.0 | 9 | 3.0 |
| 19 | Simultaneously mixed | 2.9 | 0.0 | 9 | 3.0 |

(Evaluation Results)

As shown in Tables 1 to 5, Examples 1 to 19 exhibited good electromagnetic characteristics, and little deterioration in error rate following running, indicating good repeat running durability. By contrast, in Comparative Examples 1 to 4, in which the structure of organic acid A, or the pKa relation, did not conform to the scope of the present invention, the surface properties of the medium were rough and the S/N ratio deteriorated. In particular, in Comparative Example 10, which did not contain organic acid A, but contained only organic acid B, the surface was excessively rough, precluding evaluation by LTO-Gen 4 drive. Further, in Comparative Examples 5 to 9, in which the structure of organic acid B did not conform to the scope of the present invention, there was considerable head grime, pronounced deterioration in the error rate following running, and thus deterioration in repeat running durability.

Based on these results, the present invention was confirmed to achieve both excellent electromagnetic characteristics and repeat running durability.

The magnetic recording medium of the present invention is suitable as a backup tape in which repeat running durability is required.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic recording medium comprising a nonmagnetic layer comprising a nonmagnetic powder and a binder and a magnetic layer comprising a ferromagnetic powder and a binder in this order on a nonmagnetic support, wherein the nonmagnetic layer comprises organic acid A and organic acid B below, with an acid strength pKa(A) of organic acid A and an acid strength pKa(B) of organic acid B satisfying a relation of pKa(A)<pKa(B);

organic acid A: an unsaturated bond-containing organic acid comprising one substituent selected from the group consisting of a carboxyl group and a phosphoric acid group per molecule in which the unsaturated bond is included in an aromatic heterocyclic ring selected from the group consisting of the following three aromatic heterocyclic rings:

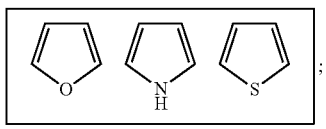

;

organic acid B: an aliphatic or alicyclic organic acid in which two or more substituents substituted onto adjacent carbon atoms within the molecule are present per molecule, and at least one of the substituents is a carboxyl group.

2. The magnetic recording medium according to claim 1, wherein the magnetic layer comprises organic acid A.

3. The magnetic recording medium according to claim 1, wherein at least one of the substituents included in organic acid B is a hydroxyl group.

4. The magnetic recording medium according to claim 1, wherein the binder comprises an aromatic ring component.

5. The magnetic recording medium according to claim 1, wherein the binder comprises a sulfonic acid (salt) group-containing binder.

6. The magnetic recording medium according to claim 1, wherein the binder comprises a polyurethane having a glass transition temperature ranging from 75° C. to 150° C.

7. The magnetic recording medium according to claim 1, wherein the binder comprises a polyester polyurethane in the form of a reaction product of polyester polyol (A) comprising structural components in the form of a dibasic acid and a glycol component, aromatic isocyanate (B), and compound (C) with a molecular weight of less than 1,000 having two or more functional groups per molecule that are capable of reacting with an isocyanate group and having a branching side chain.

8. The magnetic recording medium according to claim 7, wherein the glycol component is a glycol component denoted by general formula (I) or (II):

$$HO-CH_2-CR^1R^2-CH_2-OH \quad (I)$$

wherein, in general formula (I), each of $R^1$ and $R^2$ independently denotes a methyl group or ethyl group;

$$HO-CHR^3-CH_2-OH \quad (II)$$

wherein, in general formula (I), $R^3$ denotes a methyl group or ethyl group.

9. The magnetic recording medium according to claim 1, wherein at least one of the magnetic layer and the nonmagnetic layer further comprises at least one of a fatty acid and fatty acid ester.

* * * * *